(12) United States Patent
McKendrick et al.

(10) Patent No.: US 11,186,234 B2
(45) Date of Patent: Nov. 30, 2021

(54) VEHICLE SENSOR SYSTEMS

(71) Applicant: CYNGN, INC., Menlo Park, CA (US)

(72) Inventors: Ain McKendrick, Redwood City, CA (US); Michael W. Lowe, Santa Cruz, CA (US); Andrea Mariotti, Redwood City, CA (US); Pranav Bajoria, Mountain View, CA (US); Akash Joshi, Sunnyvale, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 16/653,725

(22) Filed: Oct. 15, 2019

(65) Prior Publication Data

US 2020/0189487 A1 Jun. 18, 2020

Related U.S. Application Data

(60) Provisional application No. 62/745,775, filed on Oct. 15, 2018.

(51) Int. Cl.
| | | |
|---|---|---|
| *H04N 5/225* | (2006.01) | |
| *G01S 7/48* | (2006.01) | |
| *B60R 19/48* | (2006.01) | |
| *B60R 11/04* | (2006.01) | |
| *G01S 7/481* | (2006.01) | |
| *G01S 7/521* | (2006.01) | |
| *B60R 11/00* | (2006.01) | |

(52) U.S. Cl.
CPC ............ *B60R 11/04* (2013.01); *G01S 7/4813* (2013.01); *G01S 7/521* (2013.01); *H04N 5/2253* (2013.01); *B60R 2011/004* (2013.01); *B60R 2011/005* (2013.01)

(58) Field of Classification Search
None
See application file for complete search history.

(56) References Cited

U.S. PATENT DOCUMENTS

| | | | | |
|---|---|---|---|---|
| 5,456,396 | A | * 10/1995 | Allen | ...................... B60R 9/045 |
| | | | | 224/309 |
| 2016/0272196 | A1* | 9/2016 | Hocking | .................. G01S 19/24 |
| 2017/0120838 | A1* | 5/2017 | Hare | ....................... B60R 11/04 |
| 2017/0144669 | A1* | 5/2017 | Spata | ...................... E01C 23/01 |

* cited by examiner

*Primary Examiner* — Mark T Monk
(74) *Attorney, Agent, or Firm* — Maschoff Brennan

(57) ABSTRACT

Vehicle sensor systems include modular sensor kits having one or more pods (e.g., sensor roof pods) and/or one or more bumpers (e.g., sensor bumpers). The sensor roof pods are configured to couple to a vehicle. A sensor roof pod may be positioned atop a vehicle proximate a front of the vehicle, proximate a back of the vehicle, or at any position along a top side of the vehicle being coupled, for example, using a mounting shim or a tripod. The sensor roof pods can include sensors (e.g., LIDAR sensors, cameras, ultrasonic sensors, etc.), processing units, control systems (e.g., temperature and/or environmental control systems), and communication devices (e.g., networking and/or wireless devices).

11 Claims, 34 Drawing Sheets

US 11,186,234 B2

VEHICLE SENSOR SYSTEMS

CROSS-REFERENCE TO RELATED APPLICATION

This application claims the benefit of U.S. Provisional Application No. 62/745,775, filed Oct. 15, 2018, which is incorporated herein by reference.

THE FIELD OF DISCLOSURE

The present disclosure relates to vehicle sensor systems.

THE RELEVANT TECHNOLOGY

The present disclosure relates to vehicle sensor systems. More specifically, for example, the present disclosure includes embodiments related to vehicle sensor systems including modular sensor kits, which may include, for example, one or more pods (e.g., sensor roof pods) and/or one or more bumpers (e.g., sensor bumpers).

The subject matter claimed herein is not limited to embodiments that solve any disadvantages or that operate only in environments such as those described above. Rather, this section is only provided to illustrate one exemplary technology area where some embodiments described herein may be practiced.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DETAILED DESCRIPTION

The present disclosure including embodiments that relate to vehicle sensor systems including modular sensor kits. According to various embodiments, a modular sensor kit may include one more modular pods (e.g., sensor roof pods) and/or one or more modular bumpers (e.g., sensor bumpers).

According to some embodiments, a sensor roof pod may be configured to couple to a vehicle. For example, a sensor roof pod may be positioned atop a vehicle proximate a front of the vehicle, proximate a back of the vehicle, or at any position along a top side of the vehicle. In a more specific example, a roof pod may be coupled to a vehicle via a mounting shim and/or a tripod.

Furthermore, a sensor roof pod may include, for example, one or more sensors (e.g., LIDAR sensors, cameras, ultrasonic sensors, etc.), one or more processing units, one or more control systems (e.g., temperature and/or environmental control systems), and/or one or more communication devices (e.g., networking and/or wireless devices).

In some embodiments, the one or more processing units may be included (e.g., encapsulated into) a single removable container (also referred to herein as a "brainbox"). A brainbox may be easily removable and swappable (e.g., for service and/or repair). For example, a brainbox may be removed from a pod and taken to a remote facility (e.g., for repair). In at least some embodiments, the brainbox may be opened and easily maintained. Further, in some embodiments, a bench system may be provided such that a brainbox, which is removed from a pod, may be activated as if it was in a vehicle. In at least some embodiments, a roof pod may include may be configured to accommodate a selectable number of devices and/or device types. Further, in some embodiments, a roof pod may include a rail system for installation of one or more cameras.

Further, according to various embodiments, a sensor roof pod may be adjustable (e.g., to fit different sized vehicles). For example, a sensor roof pod may be expandable in more than one direction (e.g., front to back and side to side).

Further, sensor bumpers, which may also be adjustable in one or more directions, may include, for example, one or more sensors (e.g., LIDAR sensors, cameras, ultrasonic sensors, etc.), one or more processing units, one or more control systems (e.g., temperature and/or environmental control systems), and/or one or more communication devices (e.g., networking and/or wireless devices).

Embodiments of the present disclosure will be explained with reference to the accompanying drawings.

Figure 1:
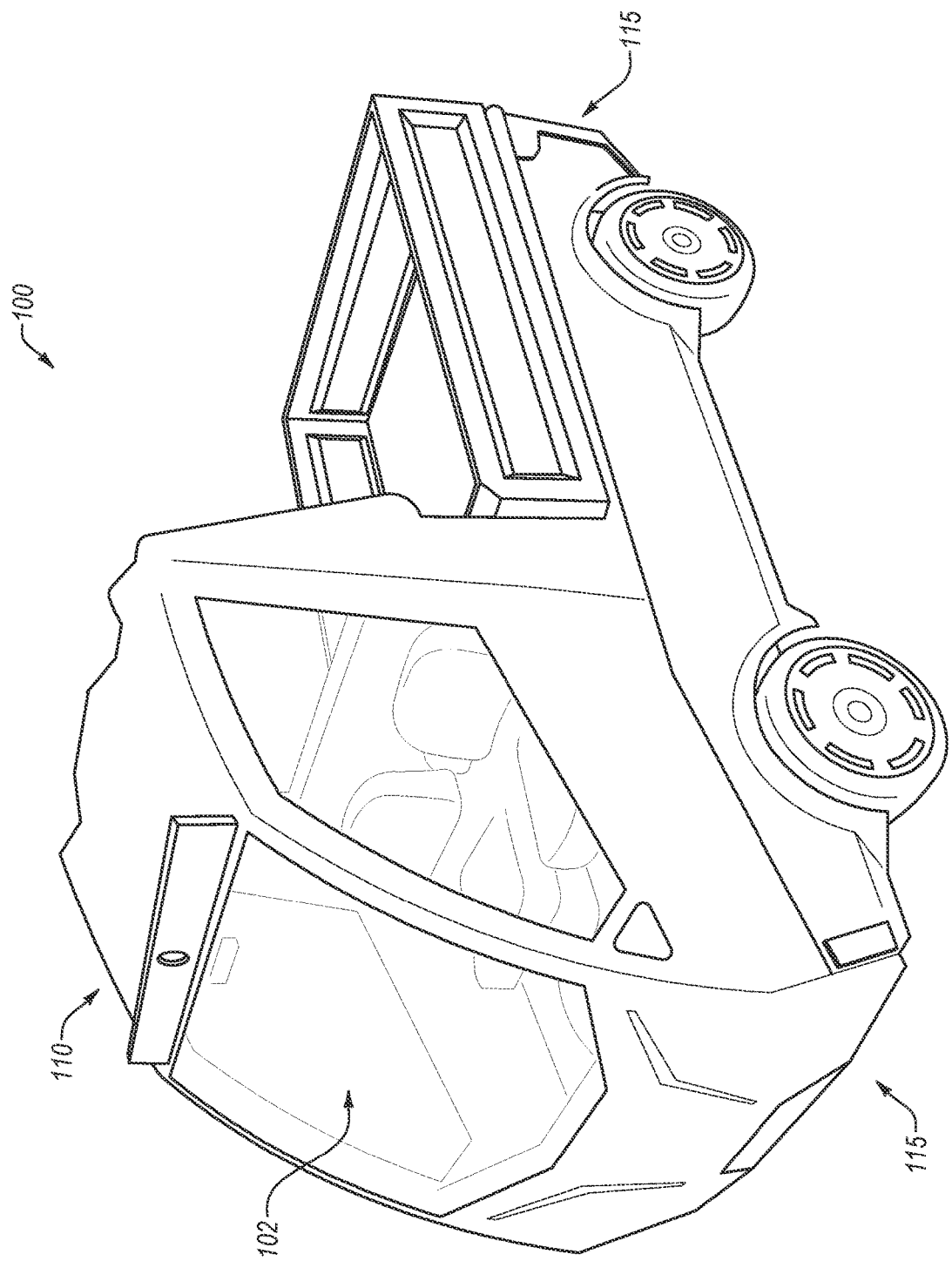
FIGS. 1-3 illustrate various example vehicles including example modular sensor kits.
Figure 2:
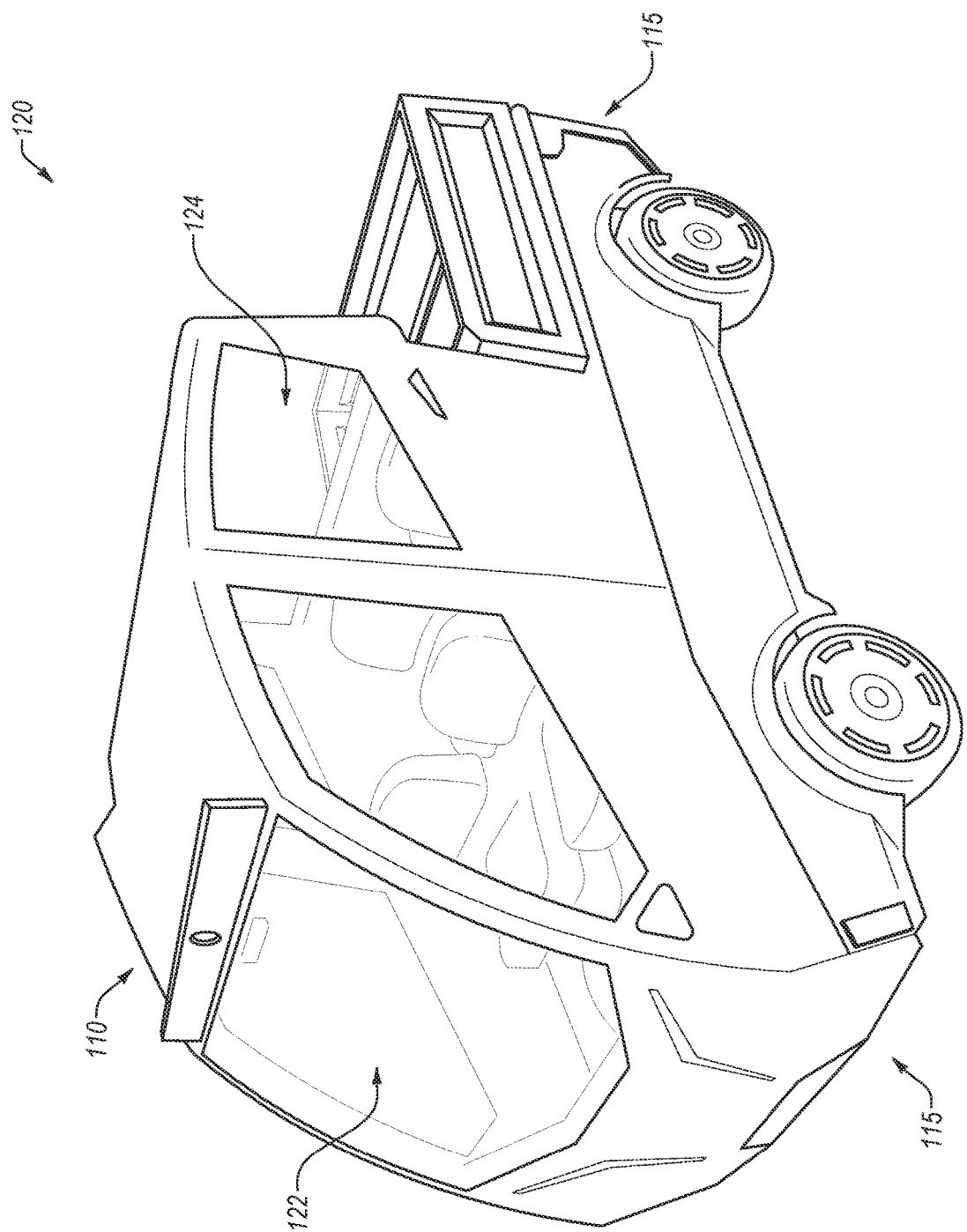
Figure 3:
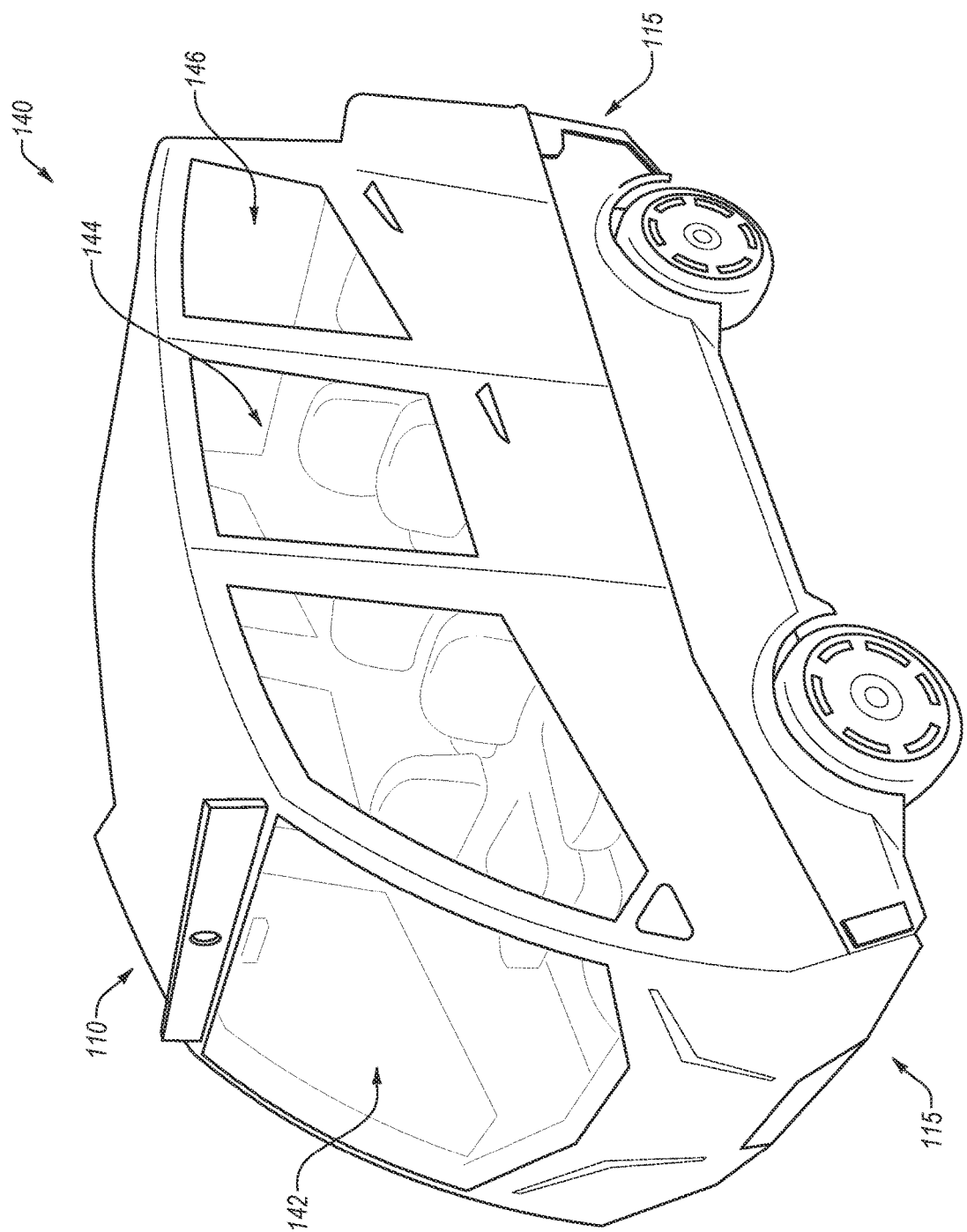
Figure 4:
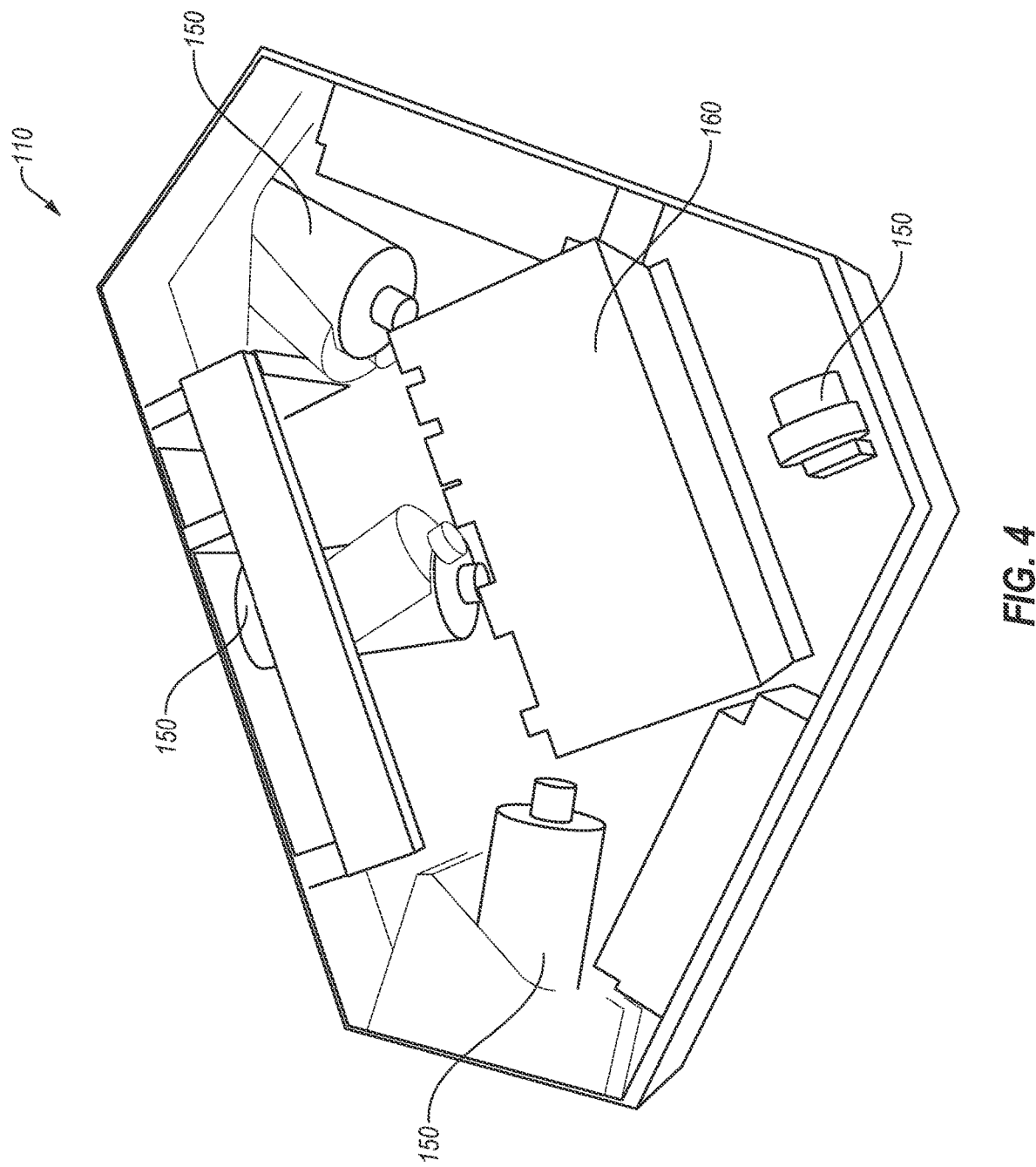
FIGS. 4-12 are various illustrations of example roof pods.

FIGS. 1-3 illustrate various vehicles including modular sensor kits. More specifically, FIG. 1 depicts a vehicle 100 including compartment 102, FIG. 2 depicts a vehicle 120 including compartment 122 and 124, and FIG. 3 depicts a vehicle 140 including compartment 142, 144, and 146. According to various embodiments, each vehicle 100, 120, and 140 may include one or more modular roof pods 110 and/or one or more modular sensor bumpers 115. According to various embodiments, roof pod 110 may be positioned atop a vehicle in front, in back, or at any position along a top side of the vehicle.

Roof pod 110 may include one or more sensors (e.g., one or more cameras, one or more LIDAR and/or ultrasonic sensors) in a front portion of roof pod 110 (e.g., near a windshield) and/or one or more sensors (e.g., one or more cameras, one or more LIDAR and/or ultrasonic sensors) in a back portion of roof pod 110 (e.g., near a rear of the vehicle). Further, roof pod 110 may also include one or more processors and/or other electronics and accessories (e.g., fans for cooling).

Further, according to some embodiments, sensor bumper 115 may include one or more sensors (e.g., one or more cameras, one or more LIDAR and/or ultrasonic sensors). In at least one embodiment, a sensor bumper positioned at the front of a vehicle may include a LIDAR sensor and a sensor bumper at a rear of the vehicle may include two or more LIDAR sensors. For example, at least some of the rear LIDAR sensors may be positioned and configured for detection toward the front and at least one side of the vehicle. Other rear LIDAR sensors may be configured for detection behind the vehicle (e.g., lateral intrusion). Thus, in these embodiments, the LIDAR sensor at the front may provide forward coverage, and the LIDAR sensors at the back may provide side coverage (e.g., from the rear toward the front) and/or rear coverage. For example, if an object is positioned next to a side door of the vehicle, this object may be detected via one or more rear sensors.

Moreover, a front sensor bumper and/or a rear sensor bumper may include one or more ultrasonic sensors. For example, in at least one specific embodiment, a sensor bumper may include one or more laser range finders.

In at least some embodiments, a processing unit (e.g., positioned within pod 110) may be configured to receive multiple inputs (e.g., from various sensors of roof pod 110 and/or sensor bumper 115) and fuse the inputs together to generate and/or update a view of a vehicle's surroundings (a "word view"). This data may be used in decision making (e.g., stopping, turning, alerts, etc.) and/or obstacle avoidance.

As noted above, roof pod 110 may include one or more cameras. For example, roof pod 110 may include one camera (e.g., positioned at a front of vehicle) for a single view. Further, roof pod 110 may include more than one camera for stereoscopic imaging.

According to various embodiments, roof pod 110 may be modular (e.g., configured for "plug and play"), and thus different parts (e.g., sensors, camera, etc.) may be selectively included within roof pod 110. Thus, roof pod 110 may be customizable for a number of sensors, different type of sensors, and/or locations of the components and/or sensors may be selectable. For example, one or more components (e.g., cameras, sensors, etc.) may be selectively arranged (e.g., at the front, sides, rear, etc.) based on a vehicle (e.g., size, configuration, and/or the capabilities of the vehicle) and/or a desired application.

For example, in one configuration, roof pod 110 may be configured to fit on a relatively small vehicle (e.g., a two-seater vehicle, such as vehicle 100). Further, roof pod 110 may be expanded (e.g., lengthwise and/or widthwise) to fit on another, larger vehicle, such as a shuttle bus). Thus, roof pod 110 may be configured for different types and/or sizes of vehicles. As another example, roof pod 110 may be sized and/or configured based on a desired application. For example, if a scenario requires more cameras, one or more ultrasonic sensors of roof pod 110 may be replaced by one or more additional cameras. In yet another example wherein a rear camera is not required, a rear facing camera of roof pod 110 may be replaced by a LIDAR and/or ultrasonic sensor. Further, for example, assuming an installed component fails (e.g., a camera fails), the component may be replaced by a working (e.g., a new) component.

For example, if roof pod 110 is expanded (e.g., lengthwise and/or widthwise) to fit on, for example, a large vehicle (e.g., a shuttle bus), a rear component (e.g., pod, sensor, camera, processor, etc.) may function as a remote component. Thus, in some embodiments, a vehicle may include a component (e.g., a pod, a camera, a processor, etc.) positioned near the front of the vehicle and another, remote component (e.g., a pod, a camera, a processor, etc.) positioned near the rear of the vehicle.

Figure 5:
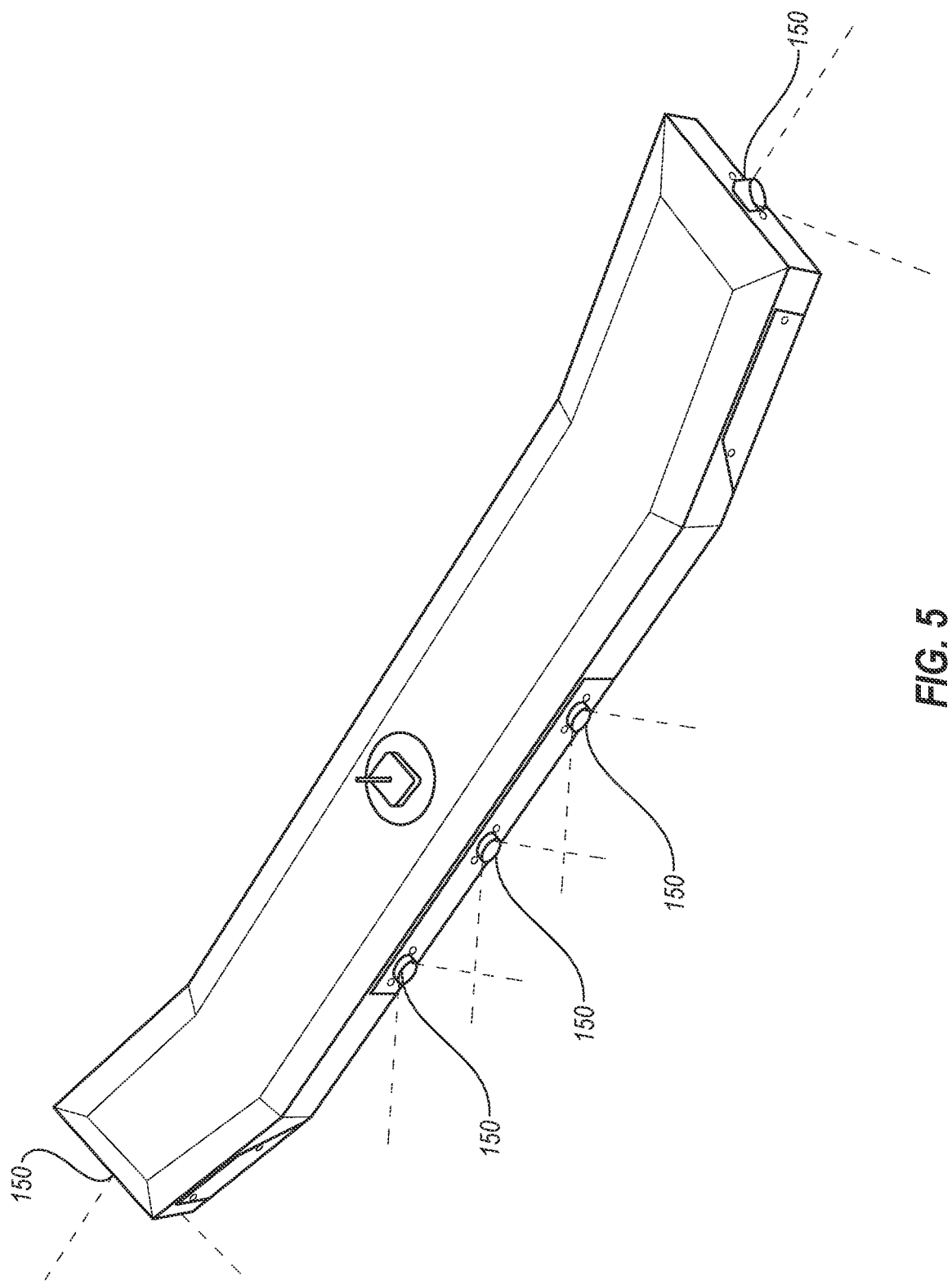
Figure 6:
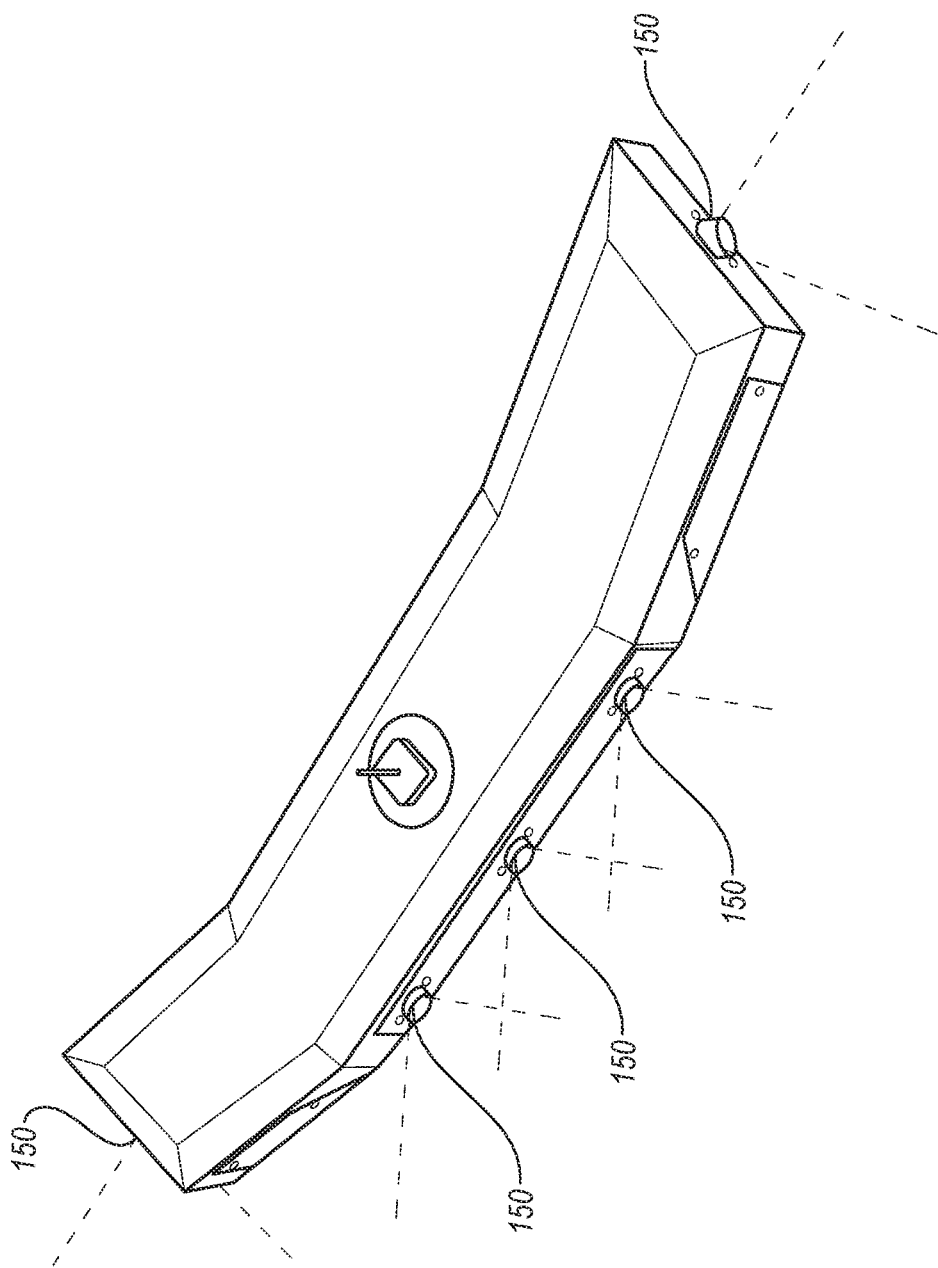
Figure 7:
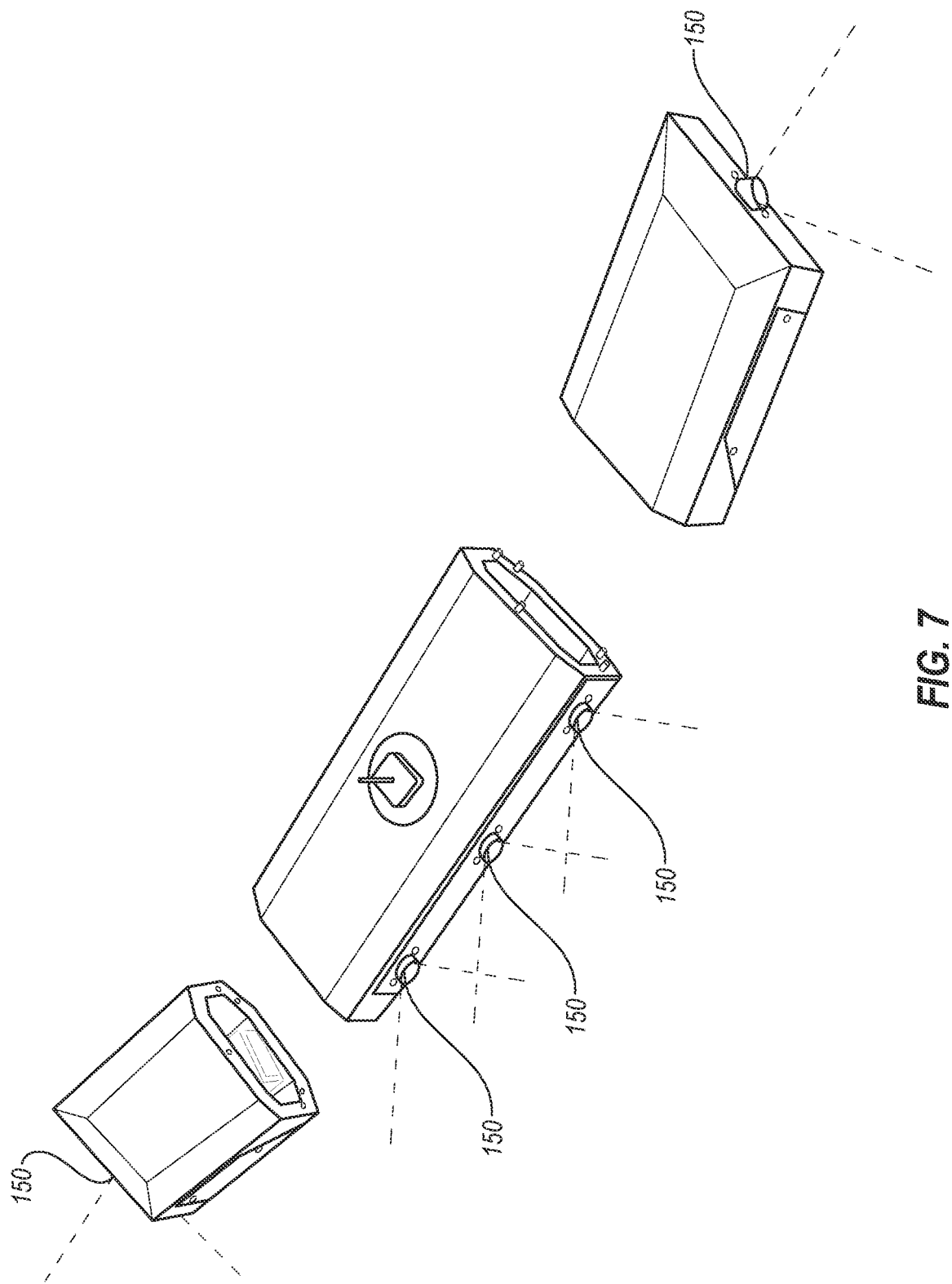
Figure 8:
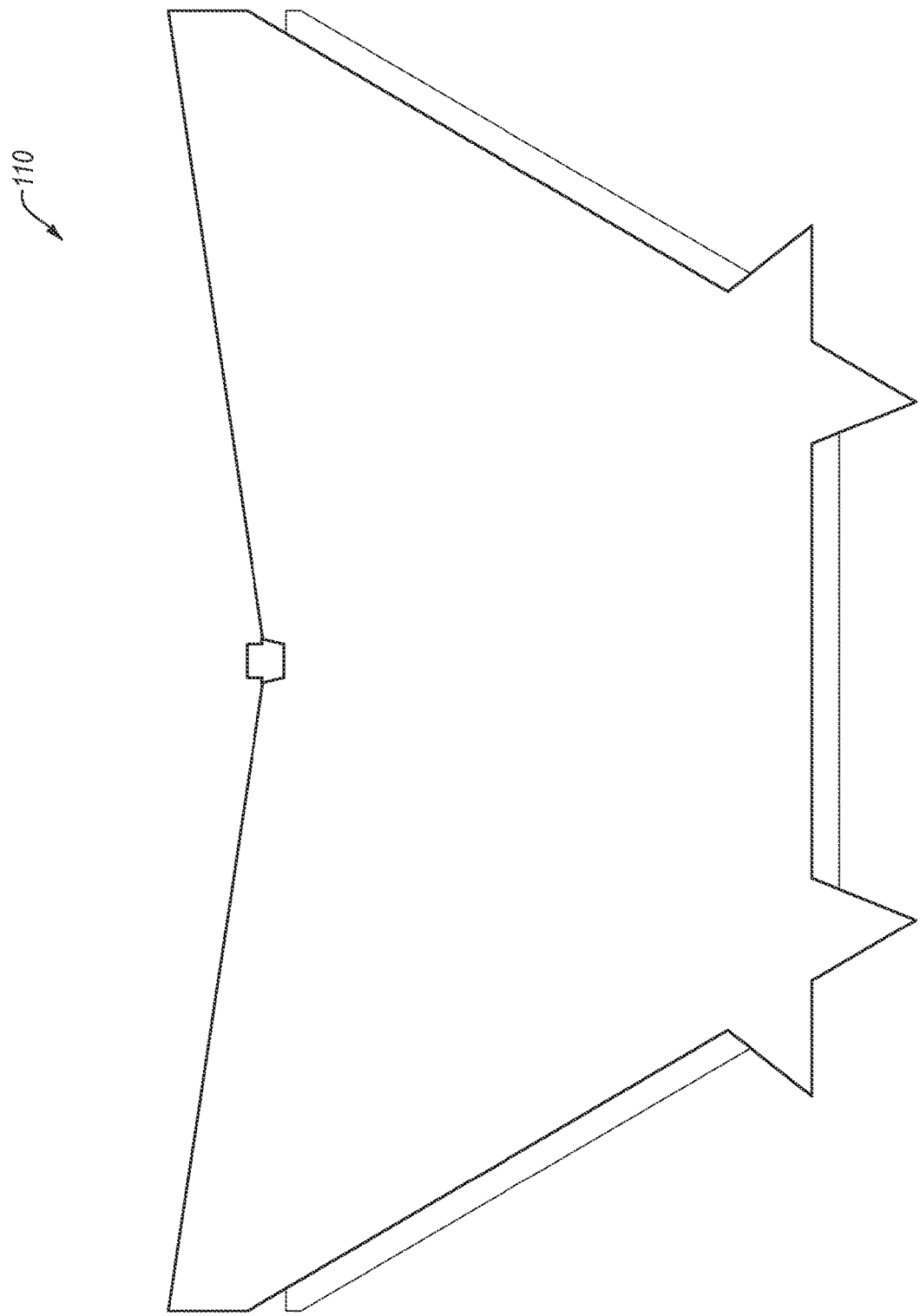
Figure 9:
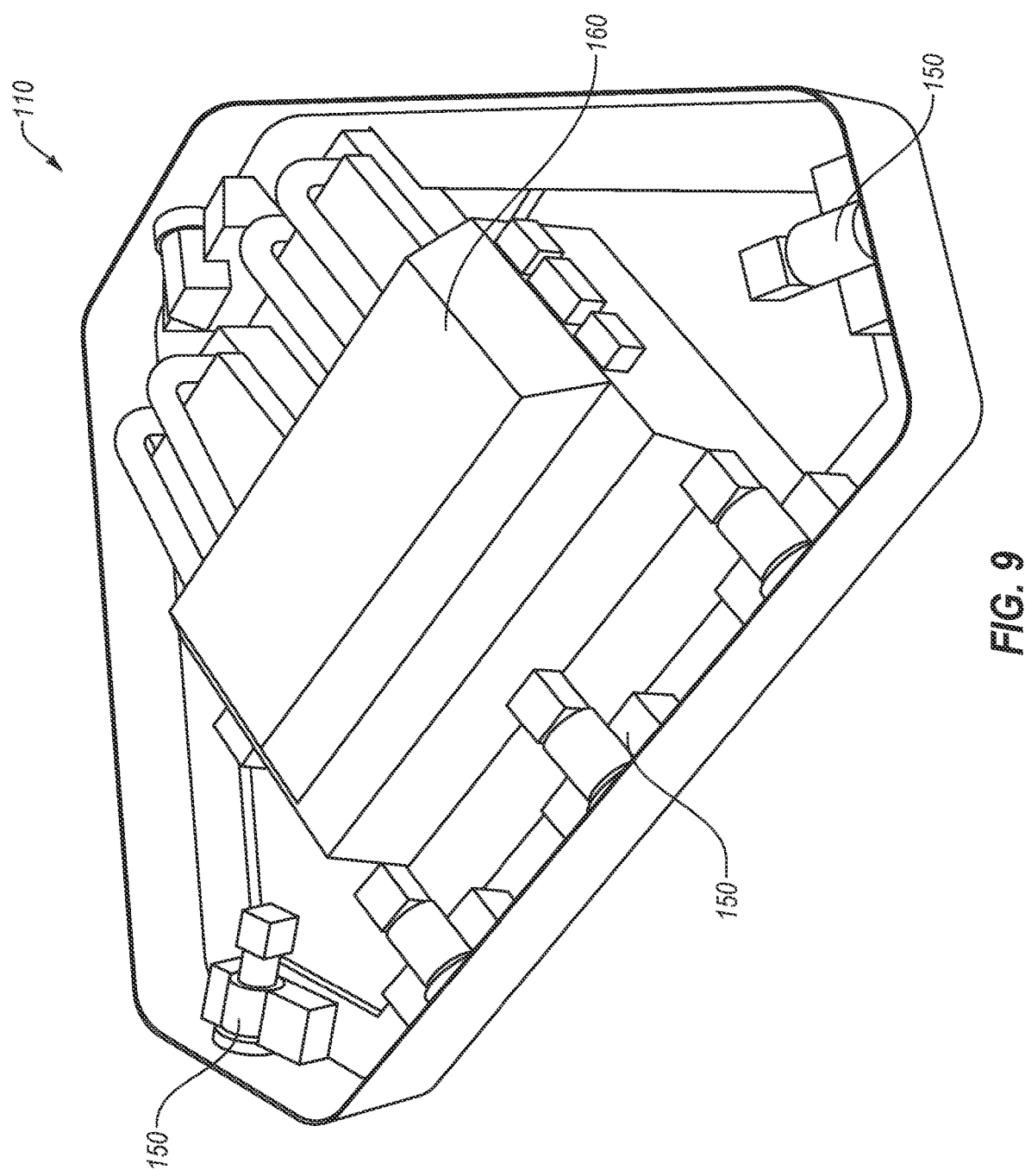
Figure 10:
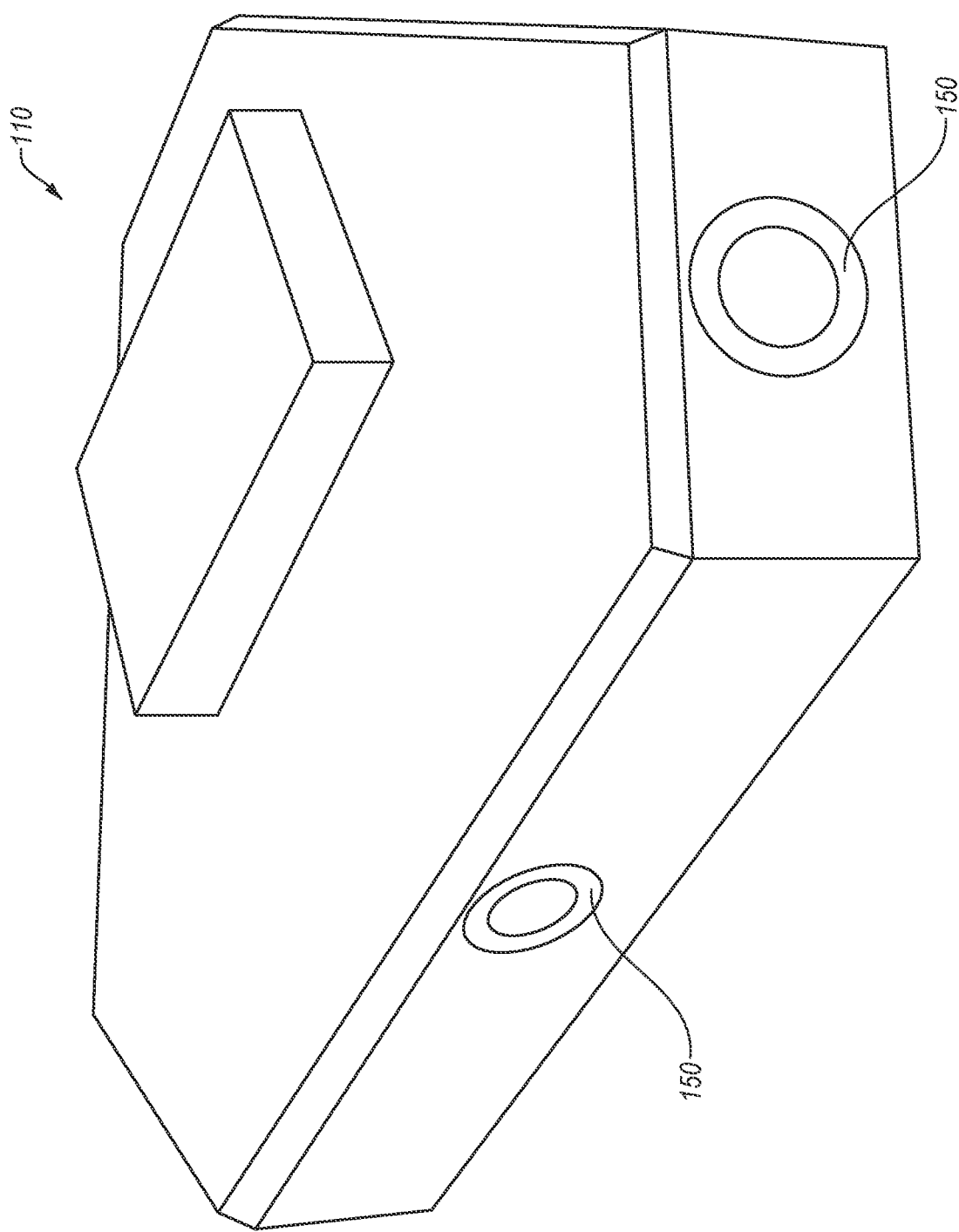
Figure 11:
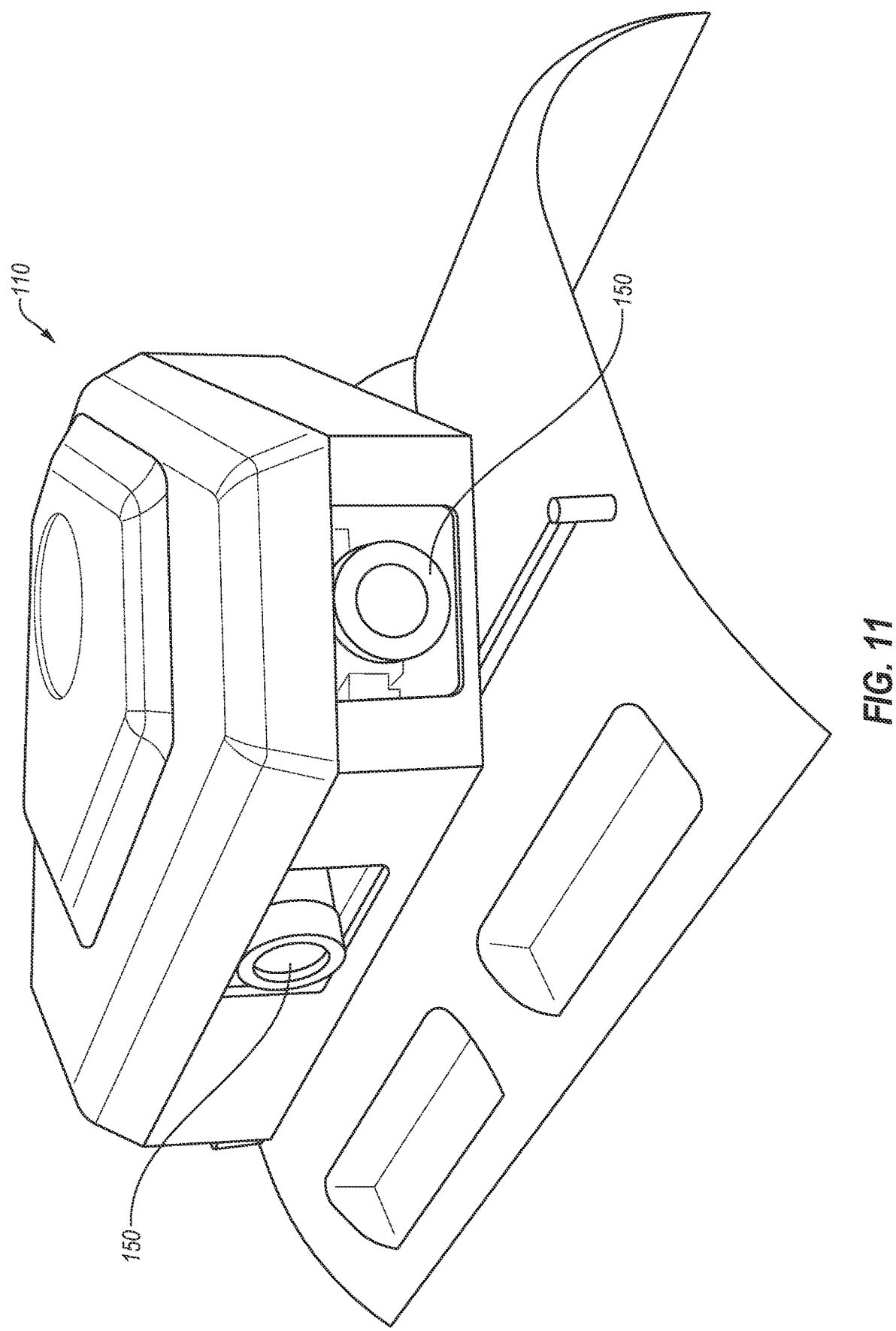
Figure 12:
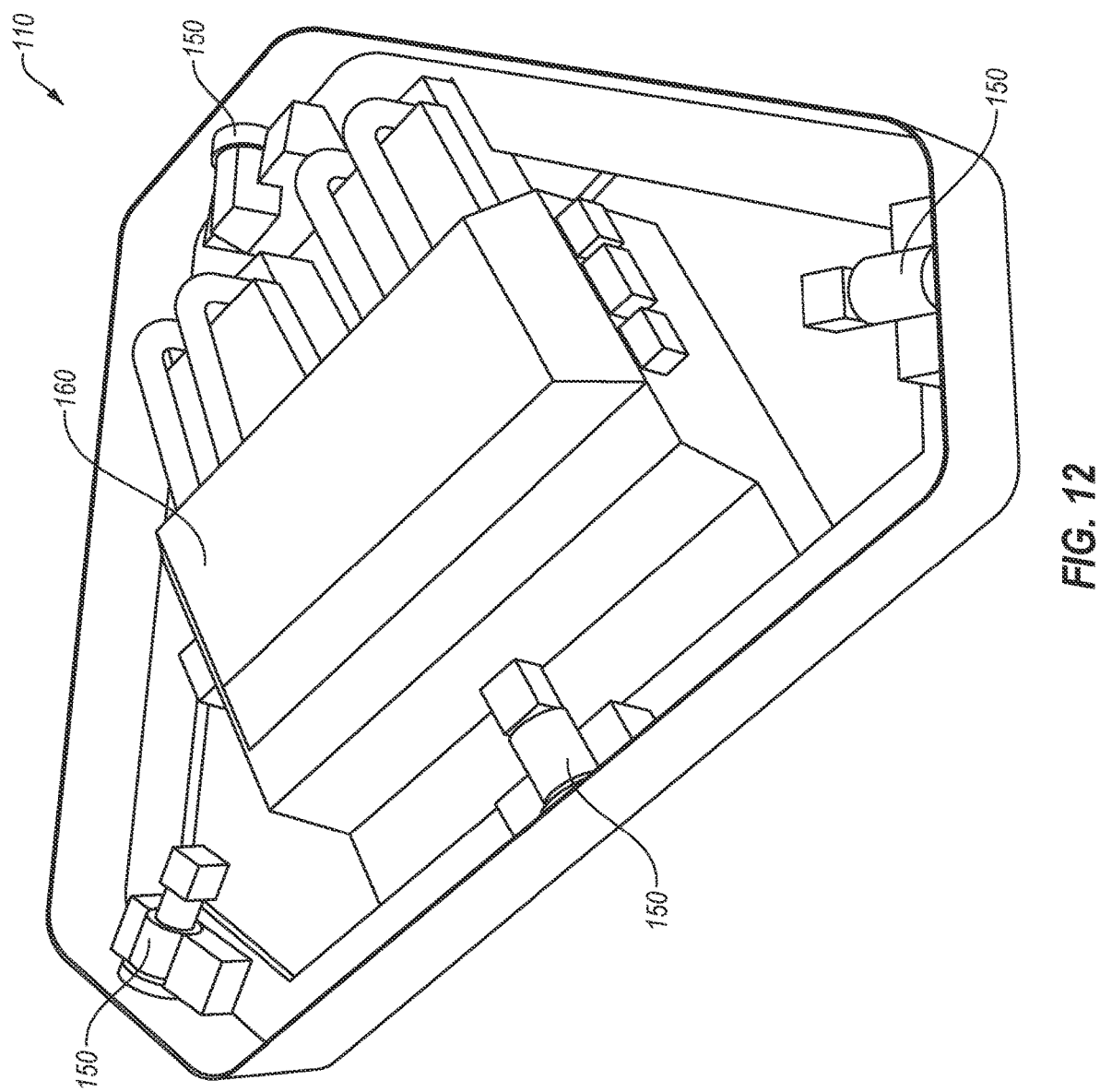
Figure 13:
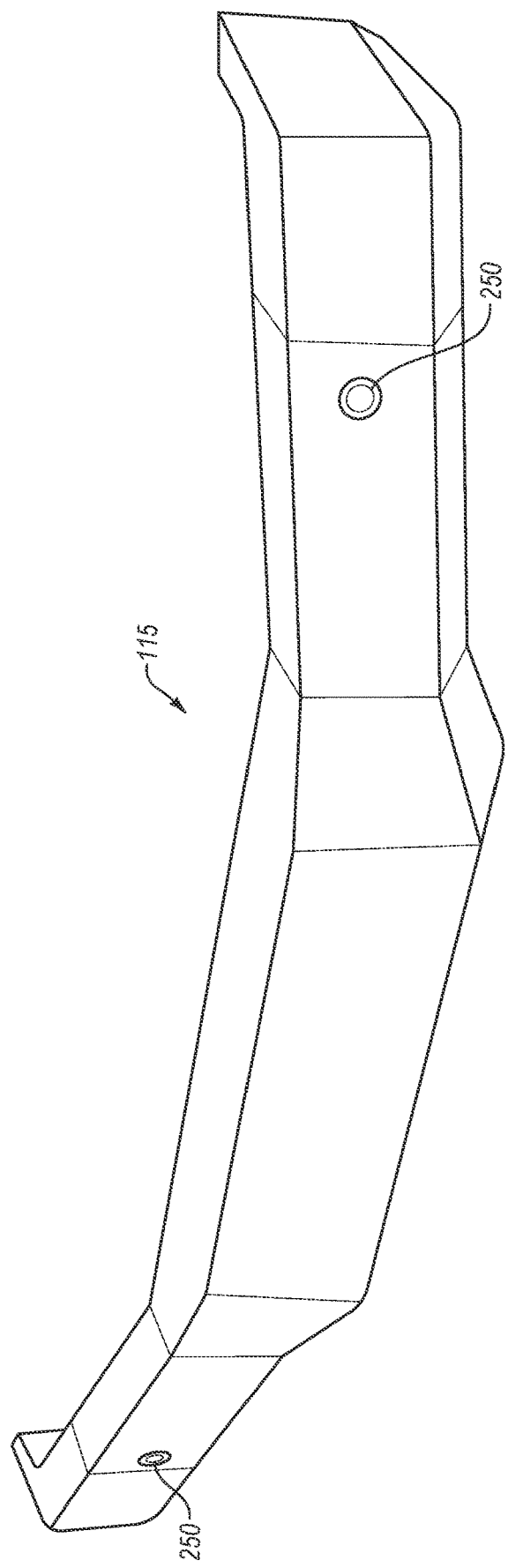
FIGS. 13 and 14 are various illustrations of example sensor bumpers.

FIGS. 4-12 are various illustrations of roof pod 110/110'. Roof pod 110 may include one or more components, such as sensors 150 (e.g., LIDAR sensors, ultrasonic sensors, cameras, etc.) and/or a processing unit 160. As illustrated in FIGS. 5-7, a pod 110', which may include a "wing" design, may be sizeable (e.g., varying widthwise) and/or modular. More specifically, as illustrated in FIG. 5, pod 110' may be a first size (e.g., a first width) and as illustrated in FIG. 6, pod 110' may be a second size (e.g., a second, wider width). Further, as illustrated in FIG. 7, pod 110' may include a plurality of units, which may be mechanically coupled together and/or electrically coupled together.

Figure 14:
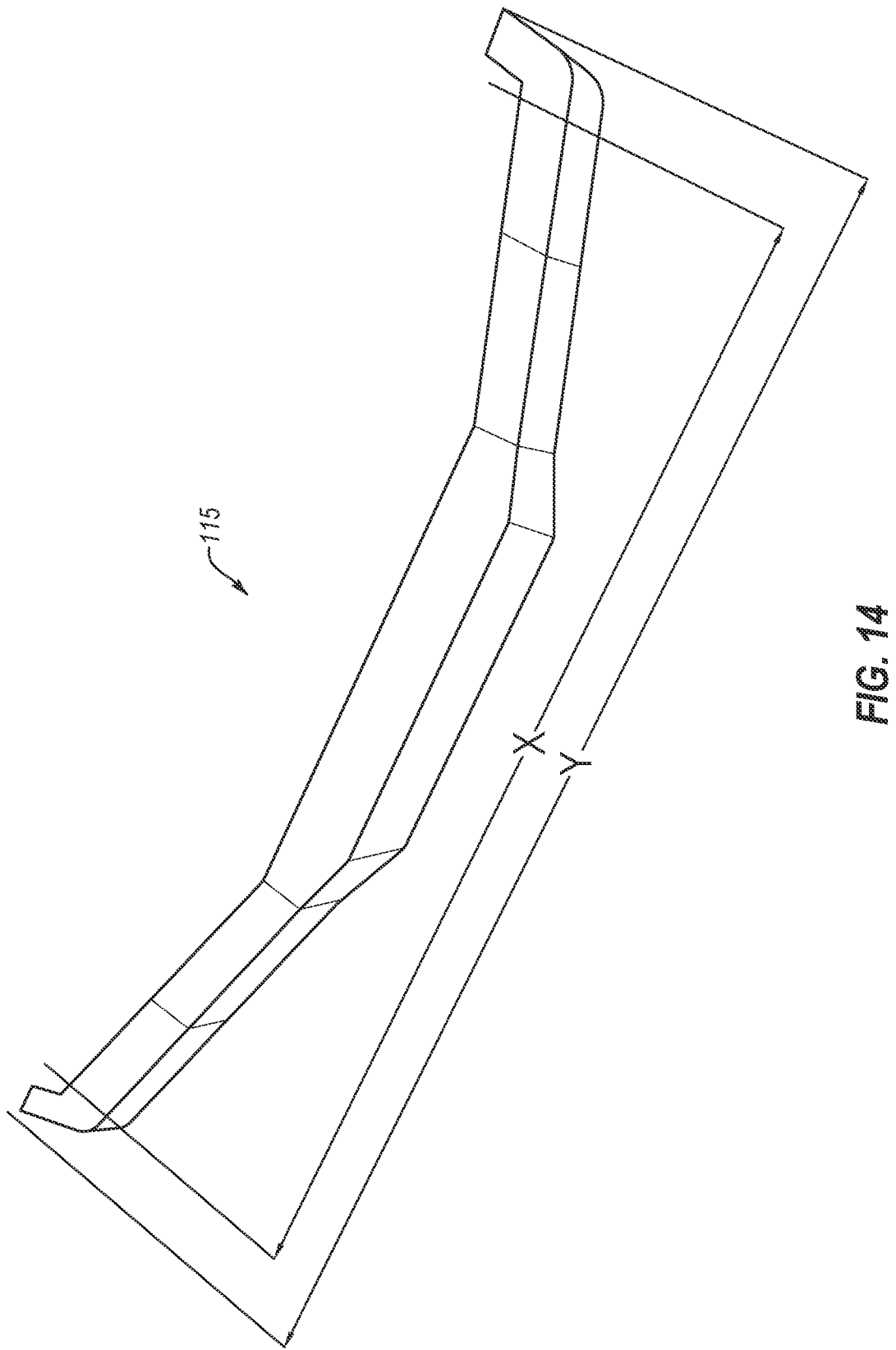
Figure 15:
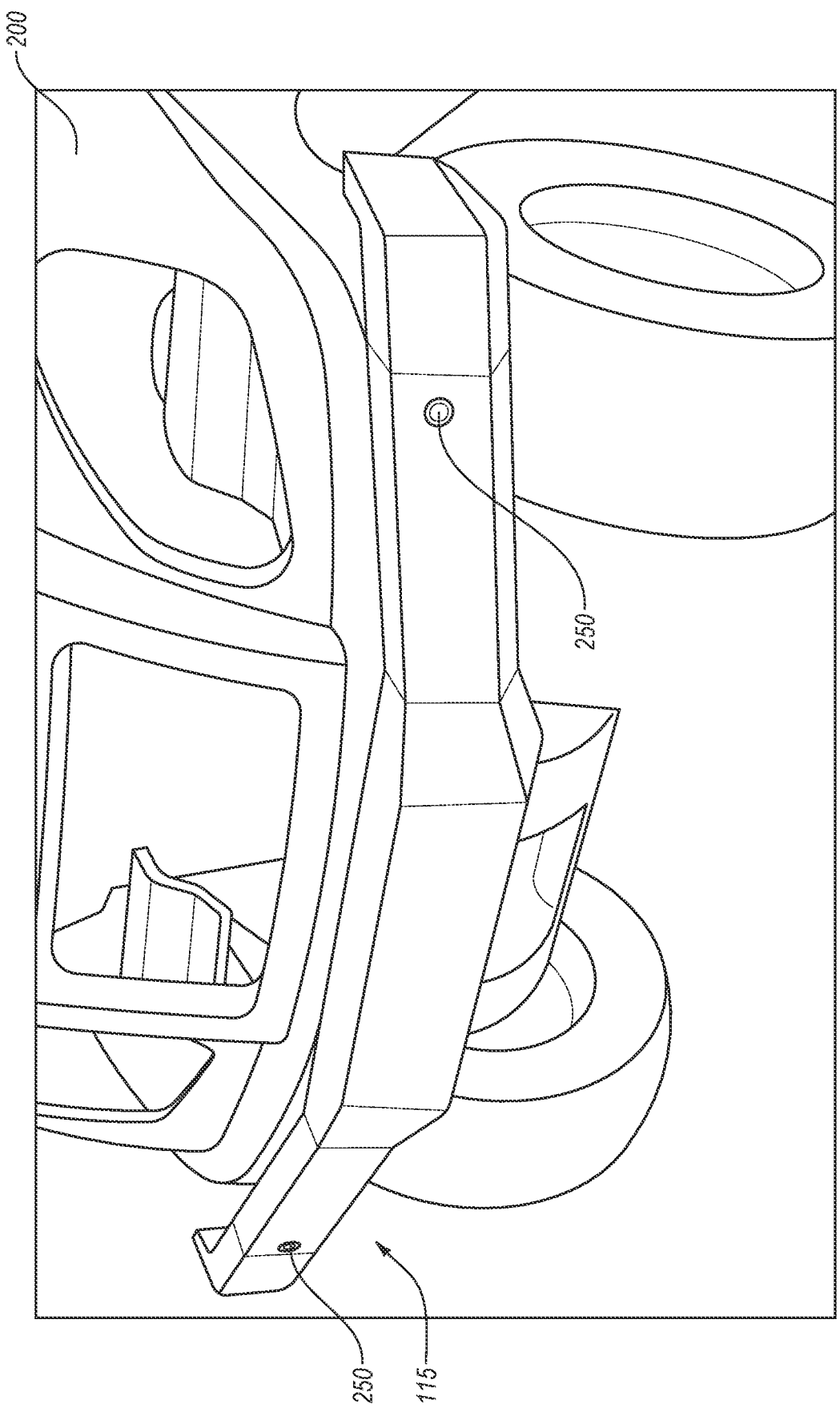
FIGS. 15 and 16 illustrate example sensors bumpers coupled to a vehicle.
Figure 16:
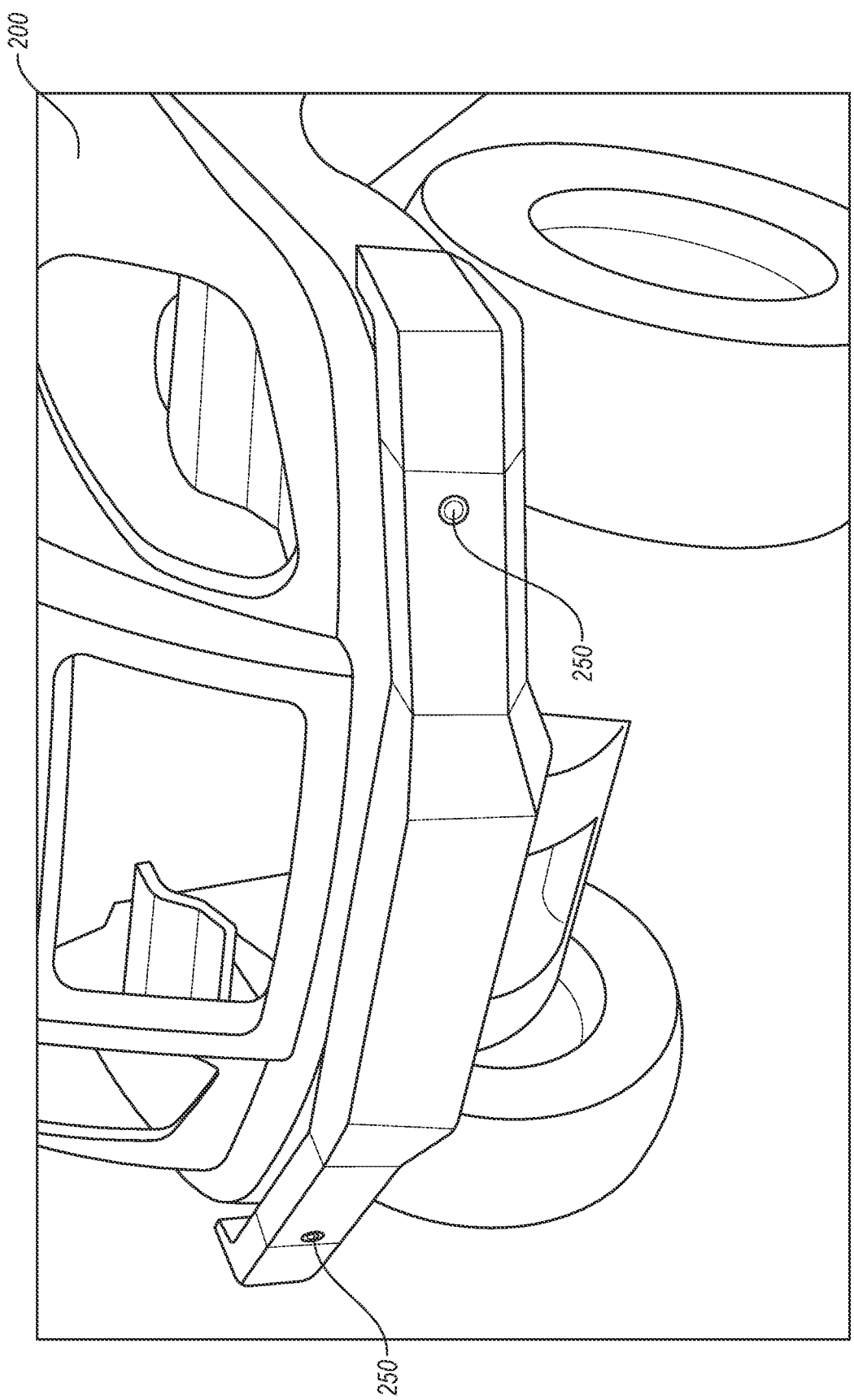
Figure 17:
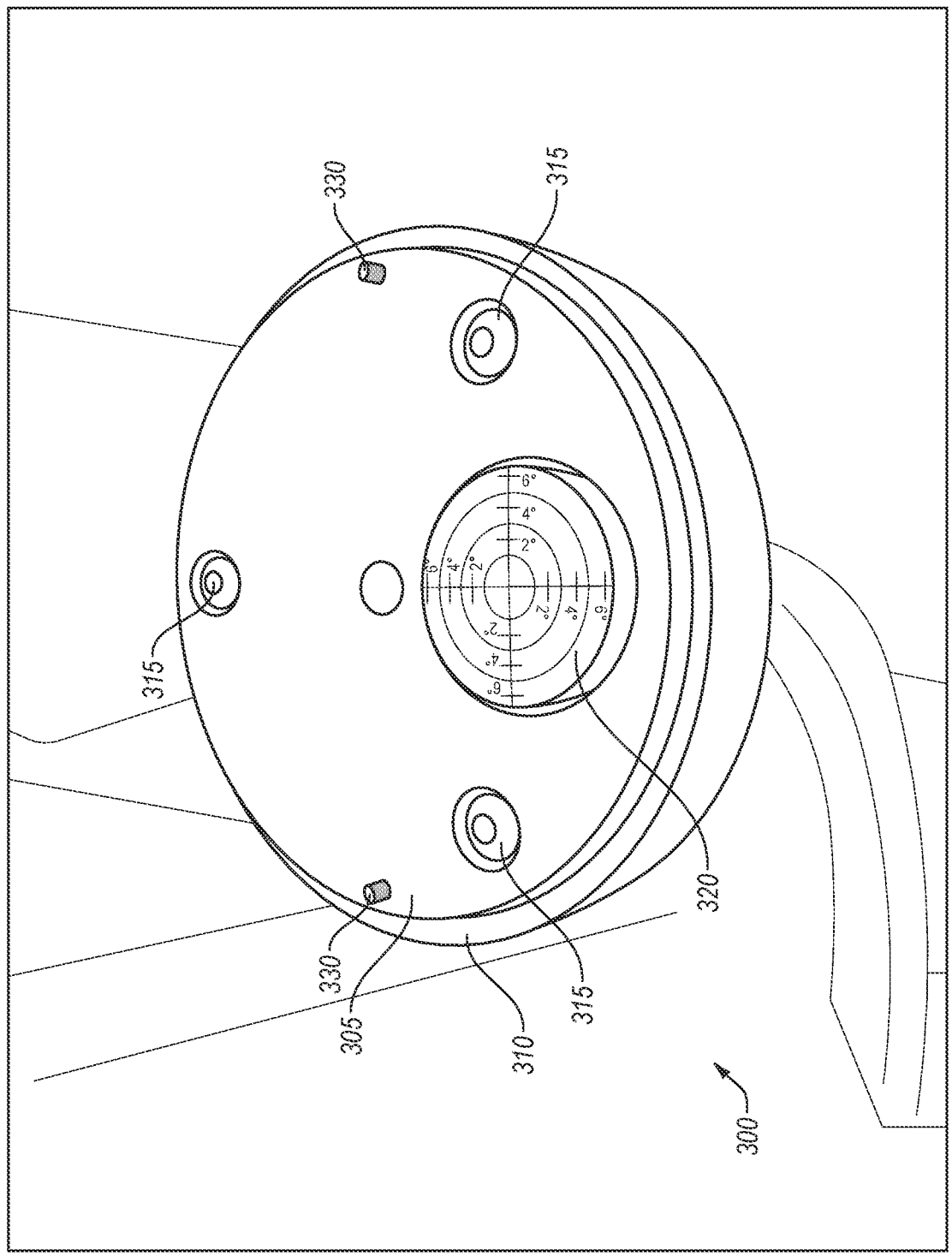
FIGS. 17-23 illustrate a leveling assembly arranged according to an embodiment.
Figure 18:
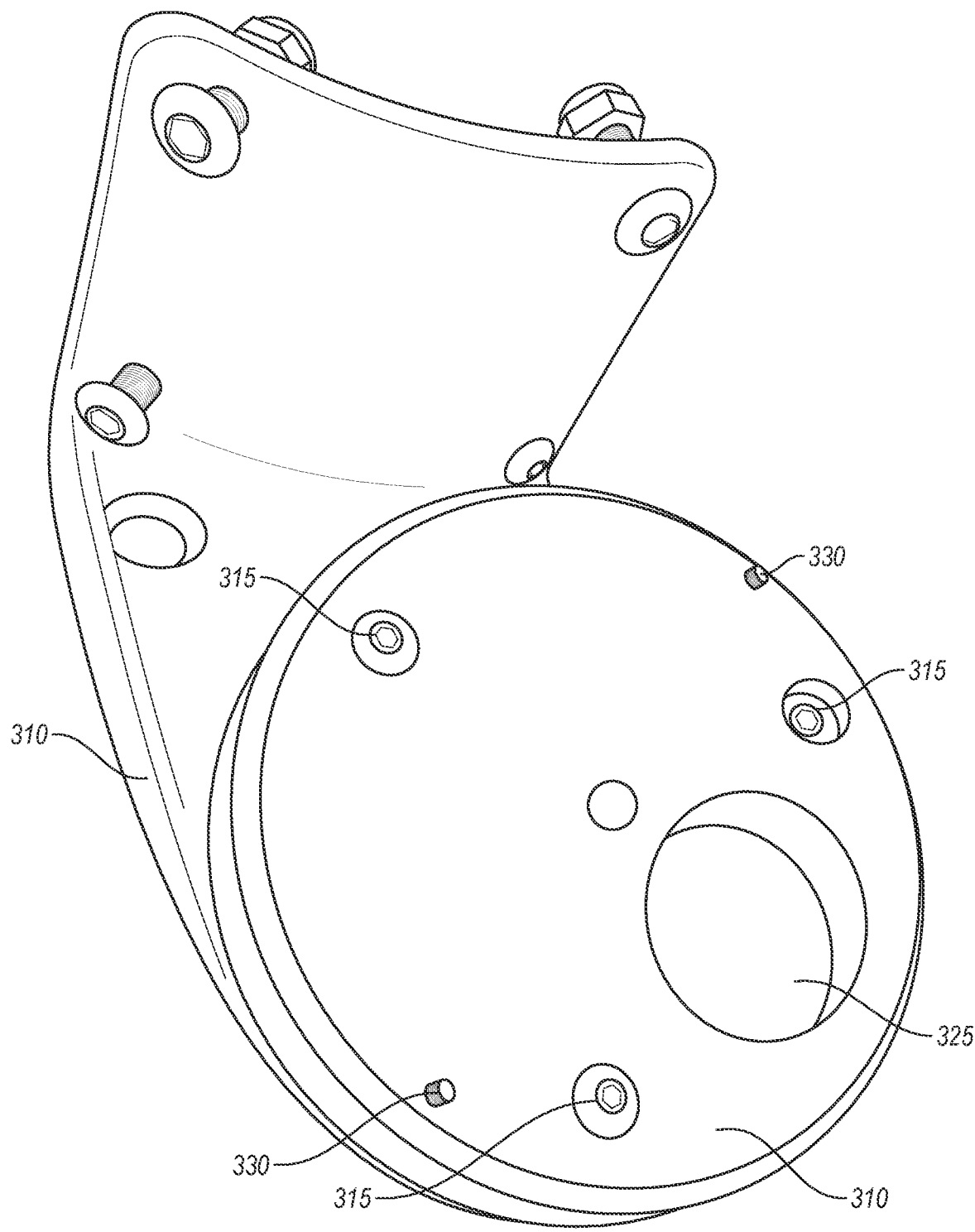
Figure 19:
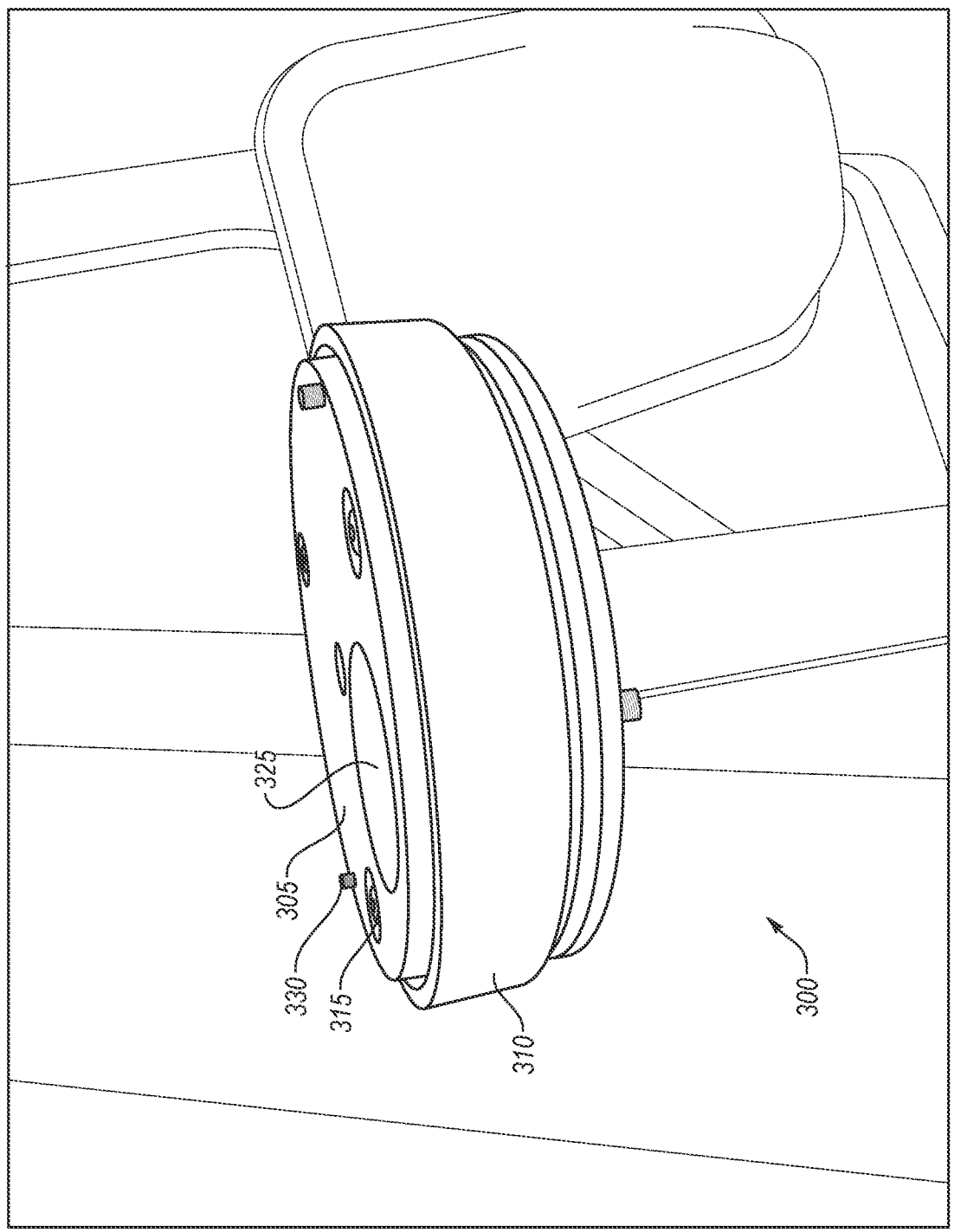
Figure 20:
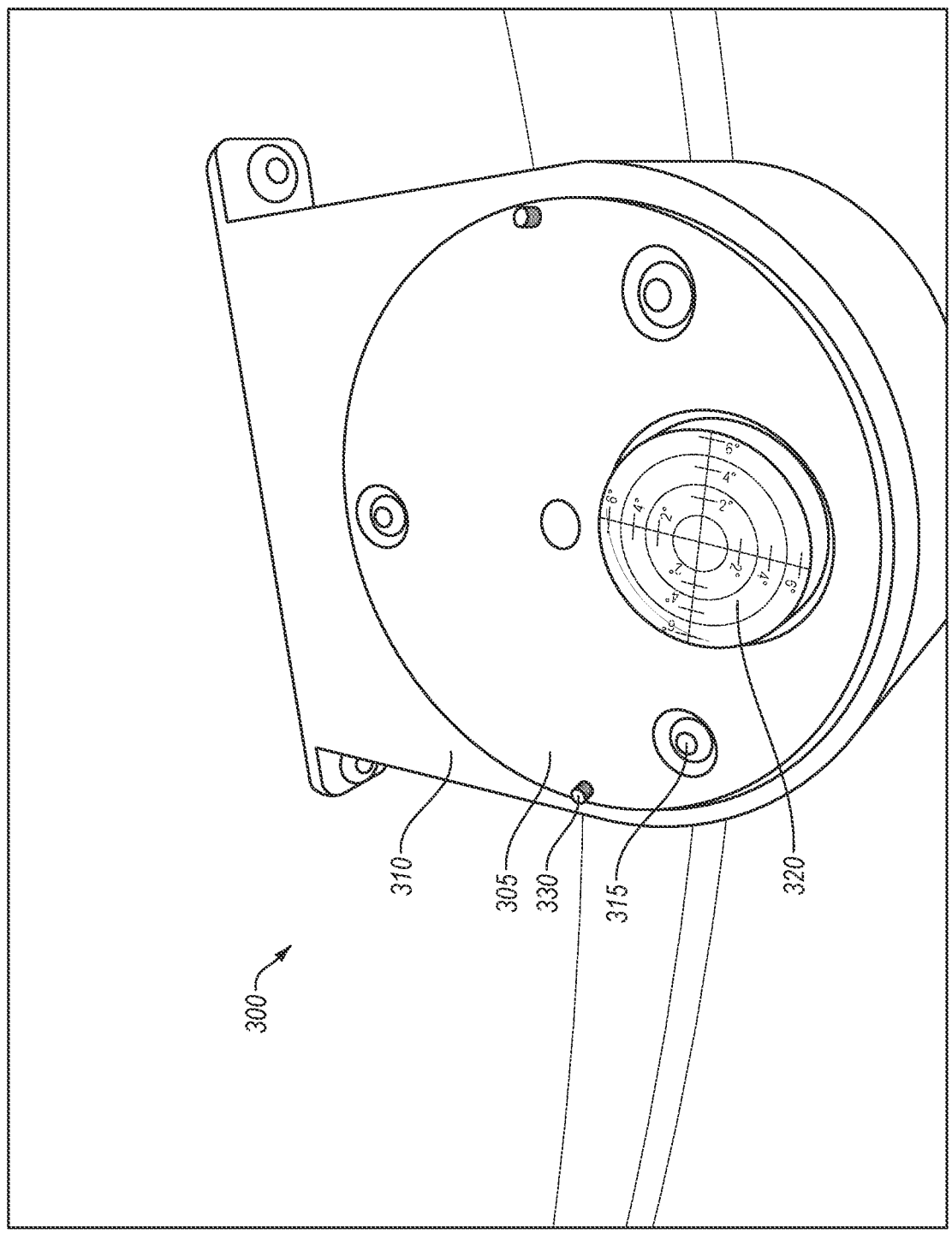
Figure 21:
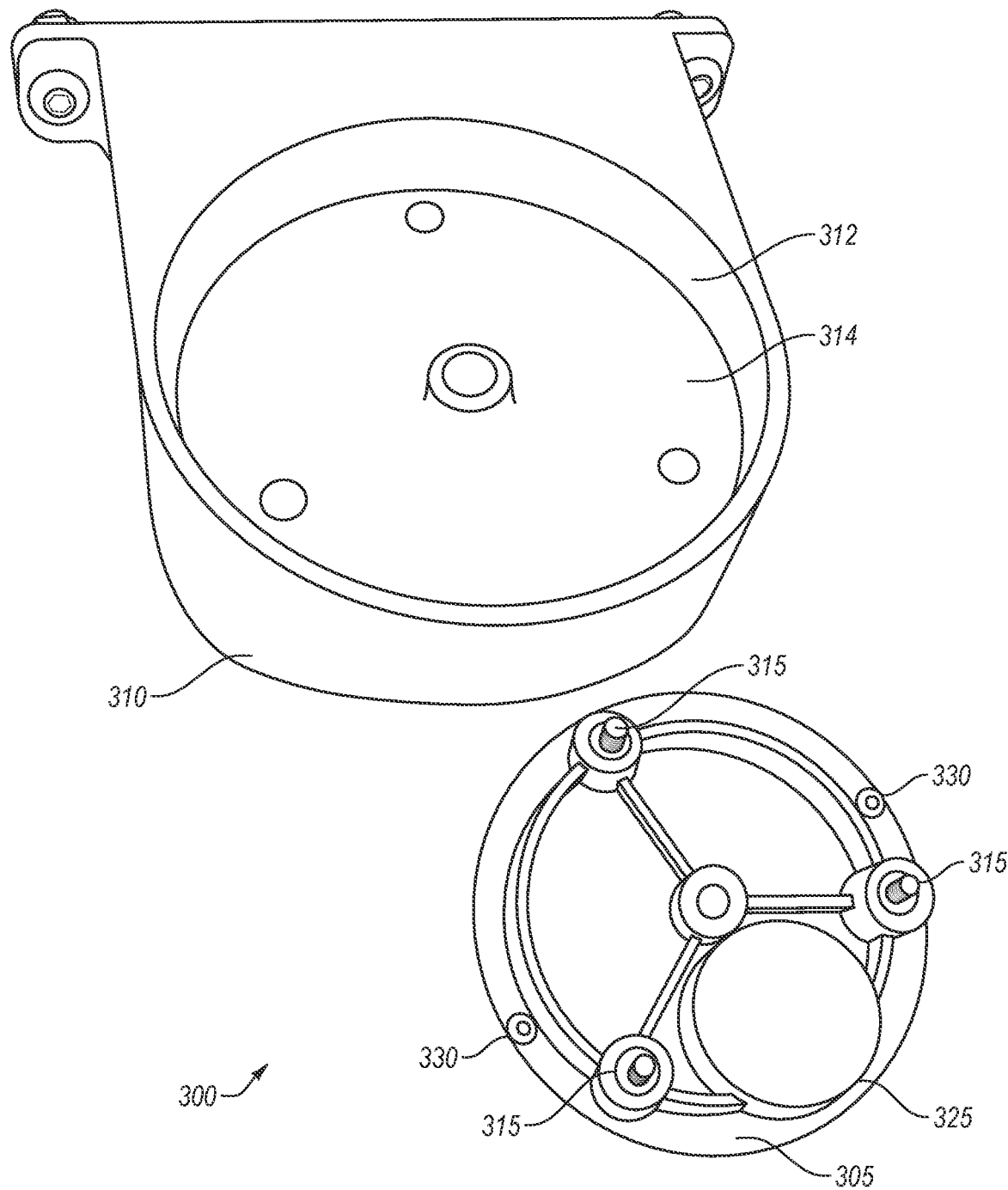
Figure 22:
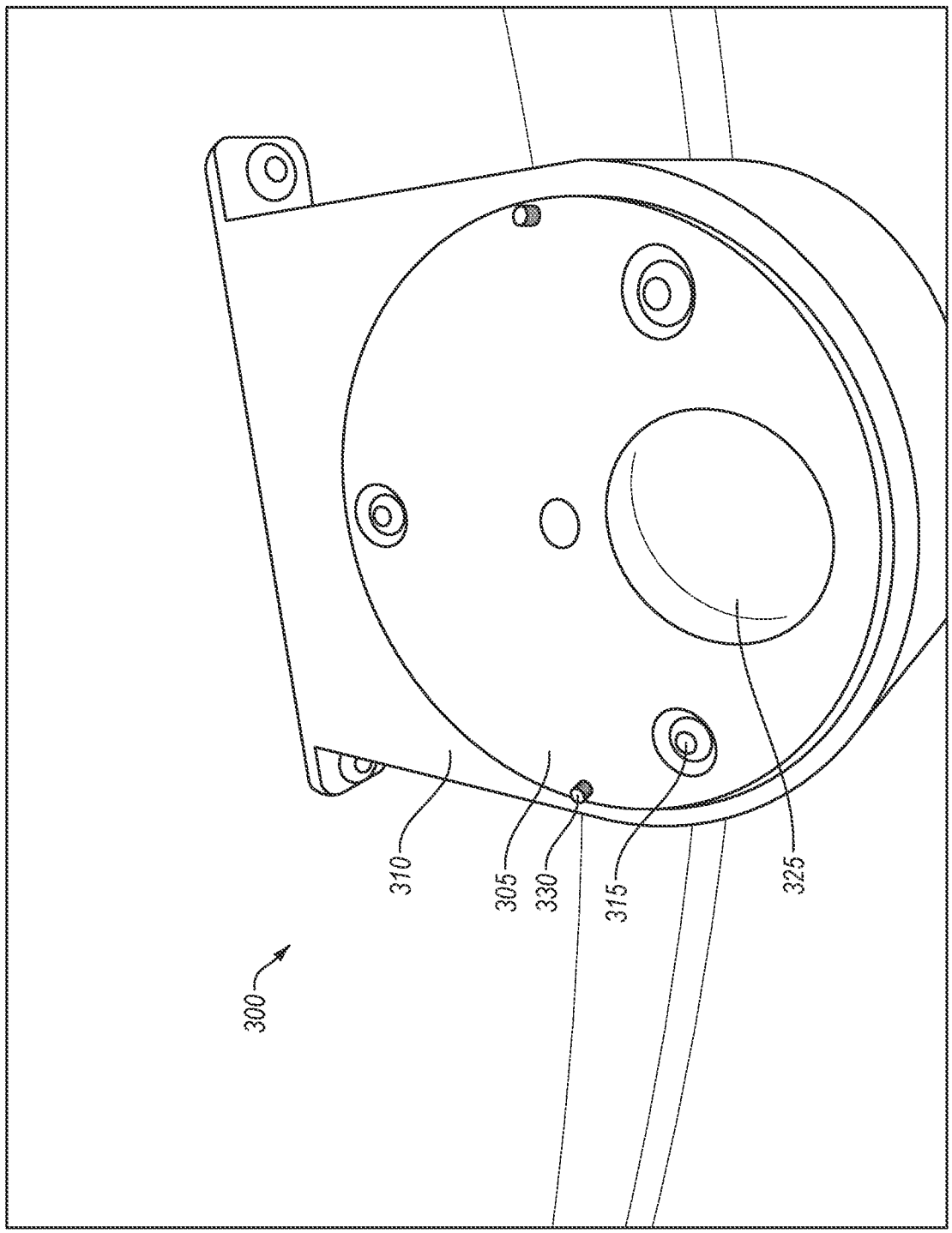
Figure 23:
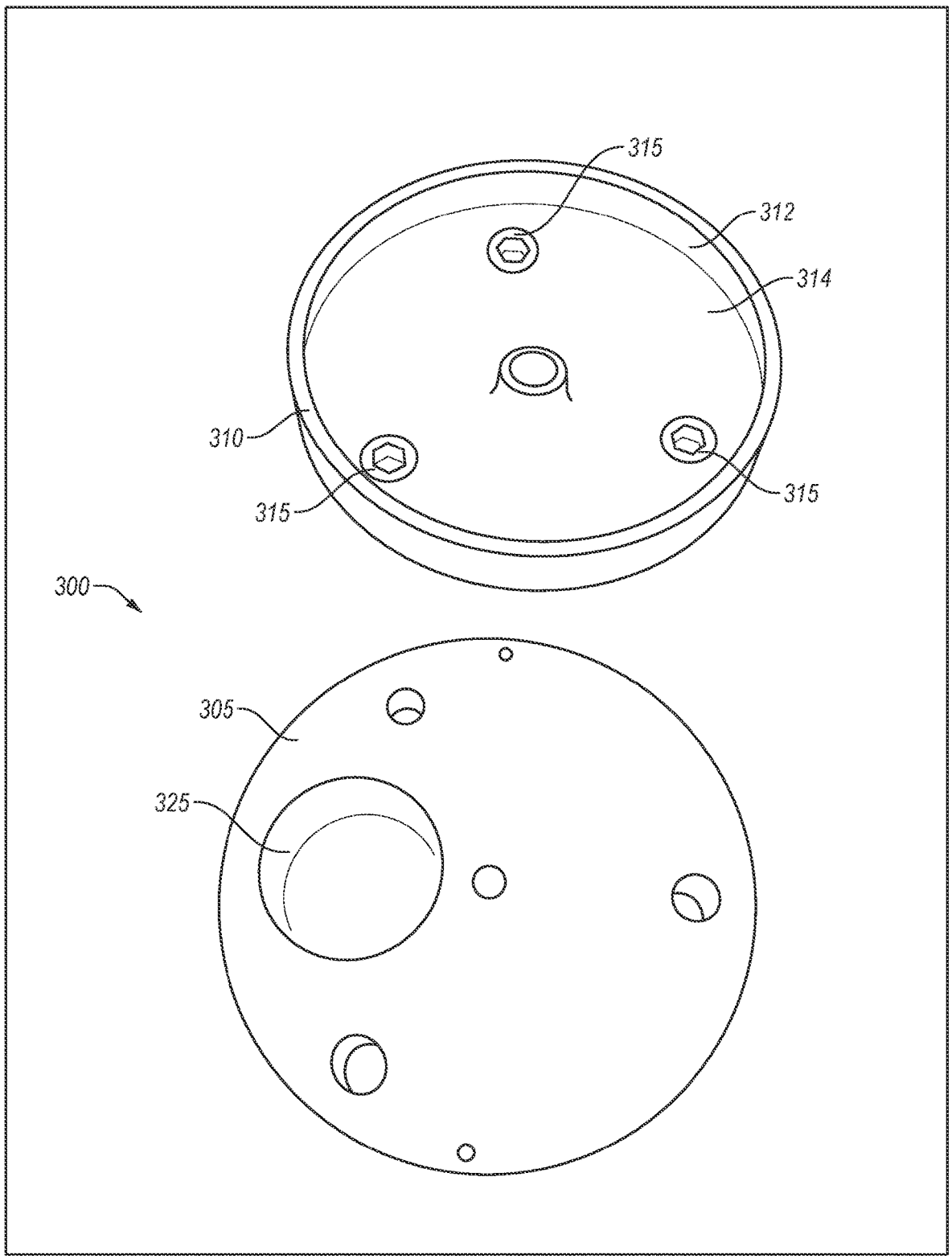
Figure 24:
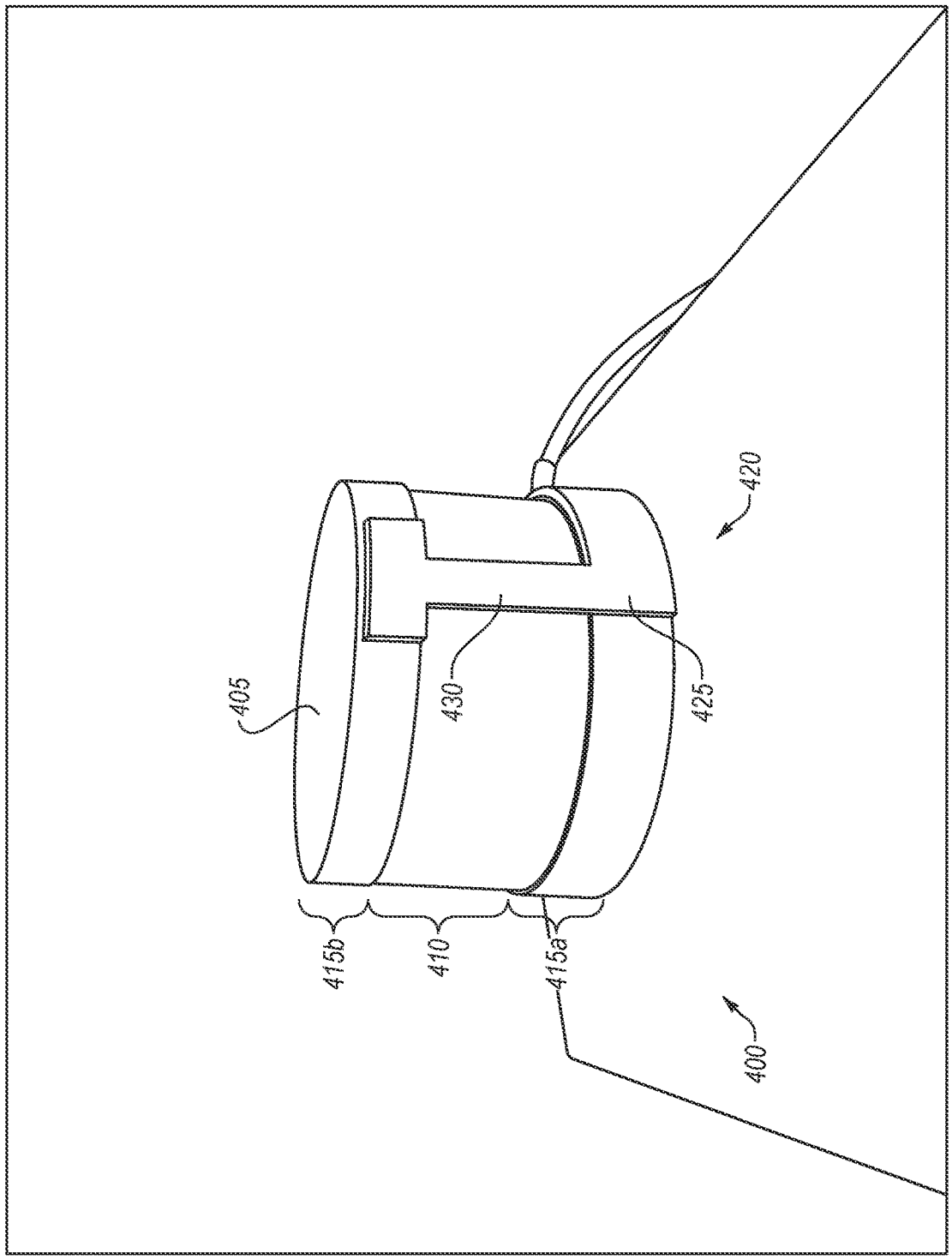
FIGS. 24-31 illustrate a sensor apparatus arranged according to an embodiment.
Figure 25:
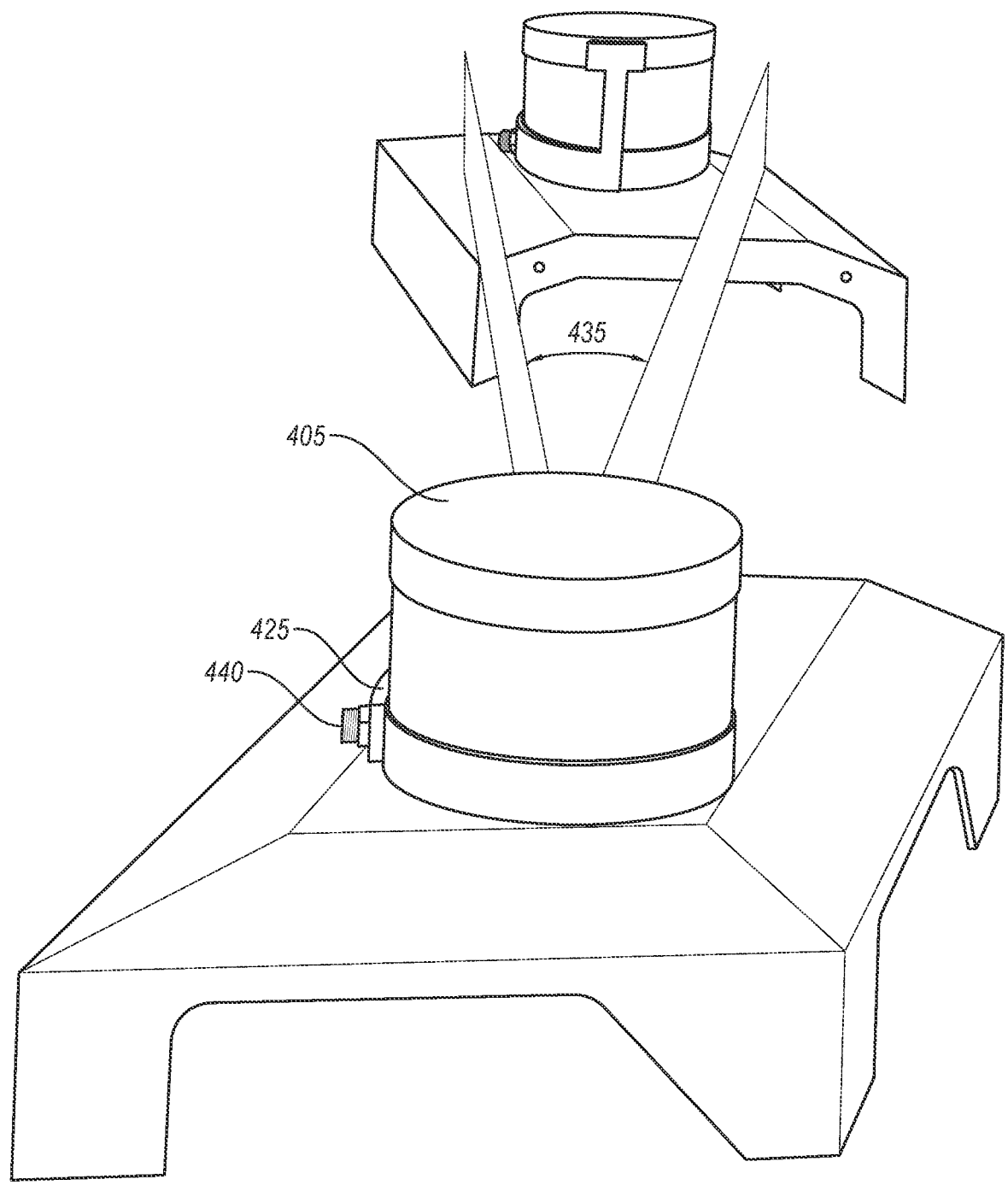
Figure 26:
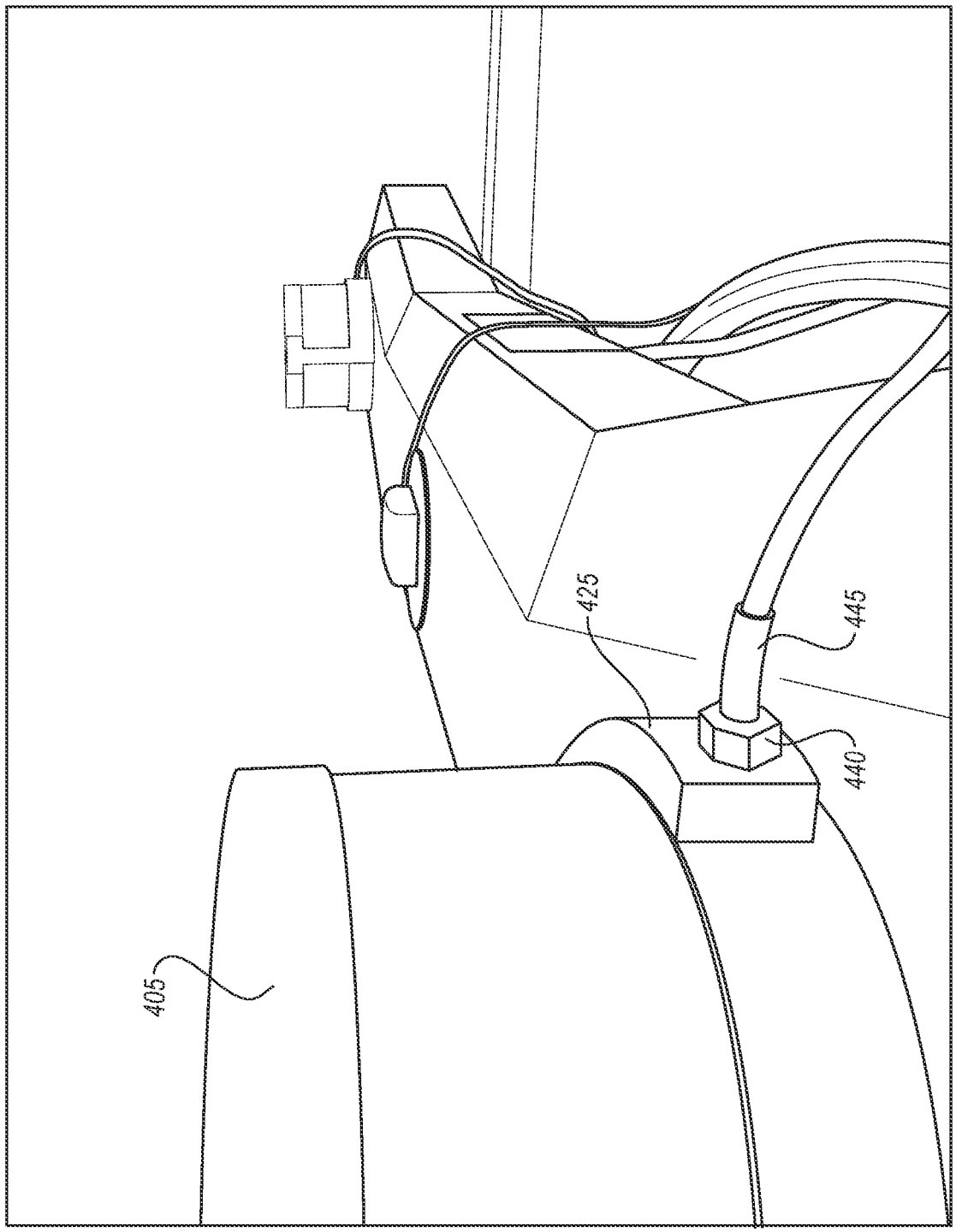
Figure 27:
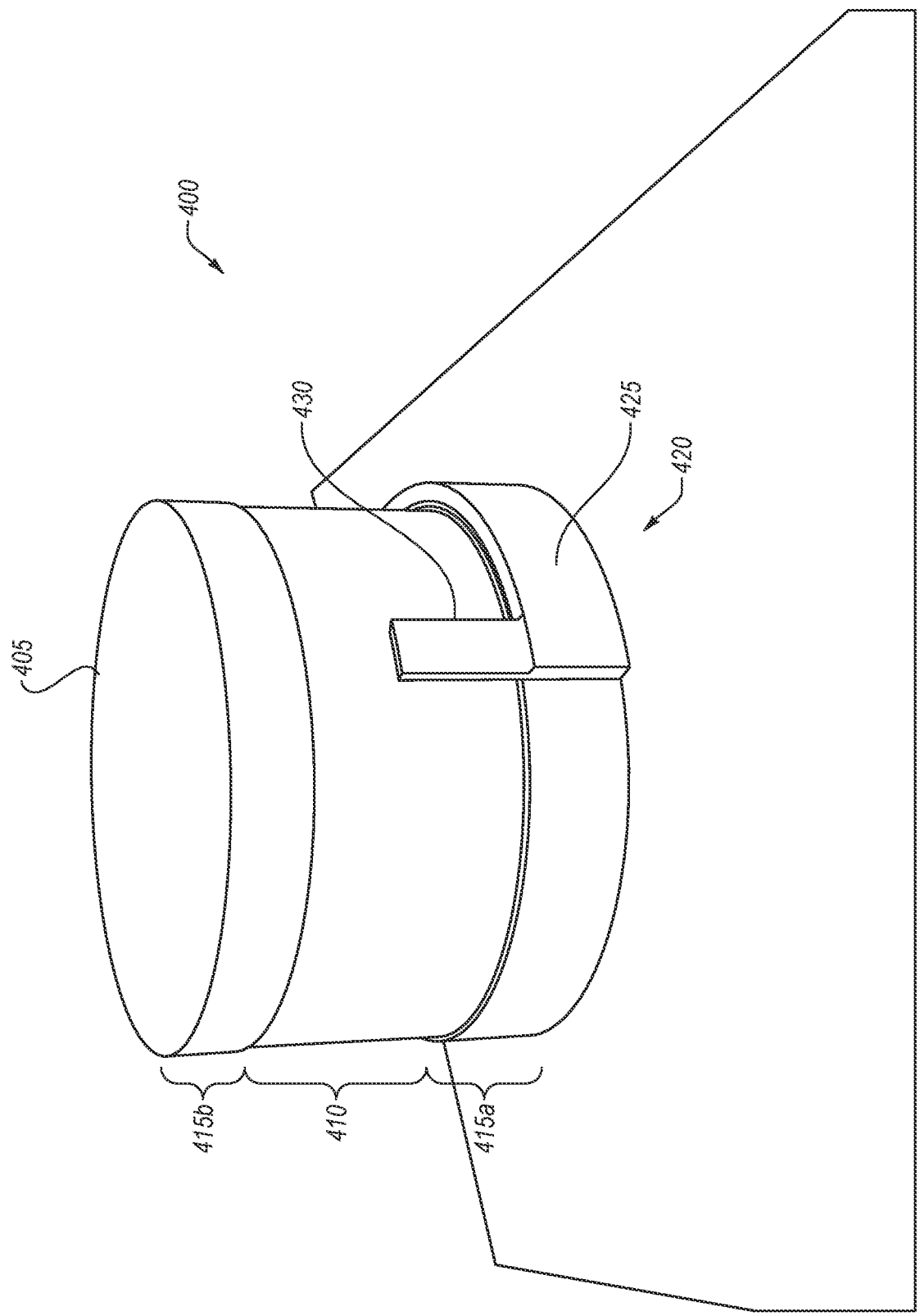

FIGS. 13-16 are illustrations of example sensor bumpers 115. For example, sensor bumper 115 may include one or more sensors 250 (e.g., LIDAR sensors, ultrasonic sensors, cameras, etc.). Further, sensor bumper 115 may be adjustable (e.g., expanded widthwise) and/or modular (e.g., for plug and play). For example, as illustrated in FIG. 14, sensor bumper 115 may be selectively configured (e.g., to fit a first vehicle) as having a first width X or a second width Y (e.g., to fit a second vehicle). Further, FIG. 15 depicts sensor bumper 115 in one configuration (e.g., a minimized configuration) on vehicle 200 and FIG. 16 depicts sensor bumper 115 in another configuration (e.g., a maximized configuration) on vehicle 200.

In some embodiments, roof pod 110 and/or sensor bumper 115 may be implemented via a computing system. Such as system may include any suitable system, apparatus, or device configured to perform the operations described in the present disclosure. The computing system may include a processor, a memory, a data storage, and a/or communication unit, which all may be communicatively coupled.

FIGS. 17-23 illustrate a leveling assembly 300 arranged according to one or more embodiments of the present disclosure. The leveling assembly 300 may include a plate 305, a mount 310, a receiving cavity 312 (illustrated in FIG. 21), an inner cavity surface 314 (illustrated in FIG. 21), adjustment screws 315, a visual cue 320 (illustrated in FIGS. 17 and 20), a recess 325 (illustrated in FIGS. 18-19 and 21-23), and fasteners 330 (illustrated in FIGS. 17-22). In these or other embodiments, the leveling assembly 300 may help enable the sensors 150/250 described above to be adjustably mounted to a portion of a vehicle in a parallel manner or in an approximately parallel manner relative to a driving surface upon which the vehicle may drive (hereinafter a "level" manner). Mounting the sensors 150/250 in a level manner may enable the sensors 150/250 to: take more accurate & predictable/reliable measurements, decrease blind spots that are not sensed by the sensors 150/250, and/or reduce a likelihood of error, crash, or safety hazard.

For example, the leveling assembly 300 may be implemented on a front/rear bumper of the vehicle, a roof top of the vehicle, and/or some other portion of the vehicle or mounted or integrated into the vehicle body. In these or other embodiments, loading of the vehicle and/or various configurations of the vehicle may cause a mounting surface for the sensors 150/250 to be a non-level mounting surface. For example, a load positioned at a back end of the vehicle (e.g., in a bed of a pick-up truck) may cause a front end of the vehicle to be angled upwards and away from the driving surface. Additionally or alternatively, the load positioned at the back end of the vehicle may cause the back end to be angled downwards and towards the driving surface. Thus, a mounting surface for the sensors 150/250 positioned at the front end/back end may be non-level.

In another example, a vehicle's suspension system may, in various applications, induce a non-level mounting surface for the sensors 150/250 (e.g., due to the suspension of the vehicle being lifted, lowered, etc.). In another example, the front end and the back end may be positioned, relative to the driving surface, higher or lower than each other in elevation. In such cases, the higher end may include a sensor 150/250 adjustably mounted to be angled slightly downward and towards the driving surface and/or the lower end may include a sensor 150/250 adjustably mounted to be angled slightly upward and away from the driving surface. In these or other embodiments, the leveling assembly 300 may allow adjustable corrections (e.g., pitch and roll in a 2-dimensional plane) to be made such that the sensors 150/250 may be mounted in a level manner and/or account for elevation differences between portions of the vehicle at which a sensor 150/250 may be mounted.

In some embodiments, the sensors 150/250 may be mounted to the plate 305 via the fasteners 330. Additionally or alternatively, the sensors 150/250 may be mounted to the plate 305 via a center hole in the plate 305 configured to receive a corresponding fastener. Prior to fastening the sensors 150/250 to the plate 305, the plate 305 may be adjusted to be level via the adjustment screws 315. Tightening and loosening of the adjustment screws 315 may cause the plate 305 to correspondingly adjust a pitch or a roll of the plate 305. For example, as one of the adjustment screws 315 is tightened, the plate 305 may be subjected to a compression force causing a portion of the plate 305 to be positioned closer to the inner cavity surface 314 within the receiving cavity 312 of the mount 310. Additionally or alternatively, as one of the adjustment screws 315 is loosened, a compression force upon a portion of the plate 305 may be reduced (or a tension force may be increased) allowing the portion of the plate to be positioned farther away from the inner cavity surface 314 within the receiving cavity 312 of the mount 310. Though the adjustment screws 315 are illustrated with three adjustment screws 315, more or fewer adjustment screws may be implemented (e.g., according to a desired adjustment resolution).

In some embodiments, the visual cue 320 may be removably installed within the recess 325 of the plate 305. The visual cue 320 may include a level indicator such as a bubble or some other indicator configured to visually indicate how level the plate 305 is. In these or other embodiments, the visual cue 320 may indicate how level the plate 305 is relative to the driving surface, relative to the force of gravity, etc. Should the visual cue 320 indicate how level the plate 305 is relative to the force of gravity (as is the case for a bubble-type level), the plate 305 may be adjusted (when mounted to the vehicle) when the vehicle is positioned on a flat or relatively flat driving surface to not over correct/under correct the inclination of the plate 305.

FIGS. 24-31 illustrate an example sensor apparatus 400 arranged according to one or more embodiments of the present disclosure. The sensor apparatus 400 may include a LIDAR sensor 405 having a sensing area 410 and non-sensing areas 415a and 415b. The sensor apparatus 400 may also include a shield 420 having a first portion 425 and a second portion 430, a field of view gap 435, a nut 440, and an input/output cable 445. The LIDAR sensor 405 may be the same as or similar to the sensors 150/250 described above. In these or other embodiments, the sensor apparatus 400 may help to inhibit interference that may be caused by adjacent sensors (e.g., adjacent LIDAR sensors 405). Interference caused by an adjacent LIDAR sensor 405 may include unwanted data that indicates or otherwise describes the adjacent LIDAR sensor 405. Additionally or alternatively, the interference caused by the adjacent LIDAR sensor 405 may be due to emitted light signals of the LIDAR sensor 405 that intersect emitted light signals of the adjacent LIDAR sensor 405. In these or other embodiments, intersecting light signals emitted by multiple LIDAR sensors may result in inaccurate data readings, false positives, etc. Thus, in some embodiments, the sensor apparatus 400 may allow multiple LIDAR sensors 405 to be mounted to a vehicle without resulting interference from an adjacent LIDAR sensor 405.

For example, the second portion 430 of the shield 420 may correspond to one or more portions of the sensing area 410 of the LIDAR sensor 405. The sensing area 410 may be positioned between the non-sensing areas 415a and 415b. As the LIDAR sensor 405 emits light signals outward through the sensing area 410 during a detection process, the second portion 430 may block one or more light signals from being emitted past the shield 420. The shield 420 may block light signals emitted from the LIDAR sensor 405 in a three-dimensional space that corresponds to a size and a shape of the second portion 430 of the shield 420. The smaller the second portion 430 is, the greater the field of view of the LIDAR sensor 405 (e.g., the greater an amount of detectable space there is that the LIDAR sensor 405 may detect (e.g., the field of view gap 435 may be smaller in size)). For example, FIGS. 27-31 illustrate the shield 420 including another embodiment of the second portion 430, in which the second portion 430 does not span an entire distance of the sensing area 410 measured between the non-sensing areas 415a and 415b. In these or other embodiments, a reduced height of the second portion 430 may help to reduce the field of view gap 435 such that the LIDAR sensor 405 may sense over an opposing LIDAR sensor 405. Additionally or alternatively, the reduced height of the second portion 430 may help to reduce the field of view gap 435 such that the LIDAR sensor 405 may sense over another object (e.g., a mirror, a body panel, etc.). Additionally or alternatively, the larger the second portion 430 is, the smaller the field of view of the LIDAR sensor 405 (e.g., the field of view gap 435 increases in size). Accordingly, the size of the second portion 430 may be based upon a size of adjacent LIDAR sensor(s) 405 and/or a position of the adjacent LIDAR sensor(s) 405 relative to the LIDAR sensor with the shield disposed thereon.

In some embodiments, the first portion 425 may be supportively connected to the second portion 430. The first portion 425 may extend in length from a first end at the nut 440 to a second end supporting the second portion 430. The first portion 425 may be configured to hug a perimeter of the non-sensing area 415a (e.g., in a concentric manner). In these or other embodiments, a position of the second portion 430 may be based on the length of the first portion 425. For example, as the length of the first portion 425 increases, the second portion 430 may be positioned farther along the perimeter relative to the nut 440. Additionally or alternatively, as the length of the first portion 425 decreases, the second portion 430 may be positioned along the perimeter closer to the nut 440.

In these or other embodiments, the length of the first portion 425 and/or the position of the second portion 430 may be based upon the size of adjacent LIDAR sensor(s) 405 and/or the position of the adjacent LIDAR sensor(s) 405. In this manner, adjacent LIDAR sensor(s) 405 need not be aligned, but may be positioned some distance in front of and/or behind (e.g., diagonally to) the LIDAR sensor 405.

In these or other embodiments, the size, shape, and/or position of the shield 420 may be based on a desired three-dimensional space defining the field of view gap 435. The field of view gap may be the three-dimensional space in which an object (e.g., an adjacent LIDAR sensor from the perspective of the LIDAR sensor 405) may be undetected by the LIDAR sensor 405. A geometry of the three-dimensional space defining the metes and bounds of the field of view gap 435 may be based upon the size, shape, and/or position of the shield 420. For example, the size, shape, and/or position of the second portion 430 positioned adjacent the sensing area 410 of the LIDAR sensor 405 may define the metes and bounds of the field of view gap 435. Thus, to position an adjacent LIDAR sensor having a certain size and shape within the field of view gap 435 of the LIDAR sensor 405, the shield 420 may be sized and shaped accordingly.

In some embodiments, the nut 440 may fasten the shield 420 to the LIDAR sensor 405. For example, the nut 440 may fasten the first portion 425 of the shield 420 to one or both of the non-sensing areas 415a and 415b of the LIDAR sensor 405. Additionally or alternatively, the nut 440 may couple the input/output cable 445 to the LIDAR sensor.

Additionally or alternatively, the shield 420 may be used to create a localized shield to eliminate a particular portion of a footprint of the vehicle that would otherwise require heavy software/computing power to digitally block or remove. For example, a mirror may be an object of the vehicle that the shield 420 may be placed in the vicinity of to block the mirror (e.g., without blocking other portions of the vehicle). In these or other embodiments, other objects that may be blocked due to the shield 420 being a localized shield. For example, objects such as door handles, body panels, other non-LIDAR sensors, etc. may be blocked in a localized manner.

Figure 32:
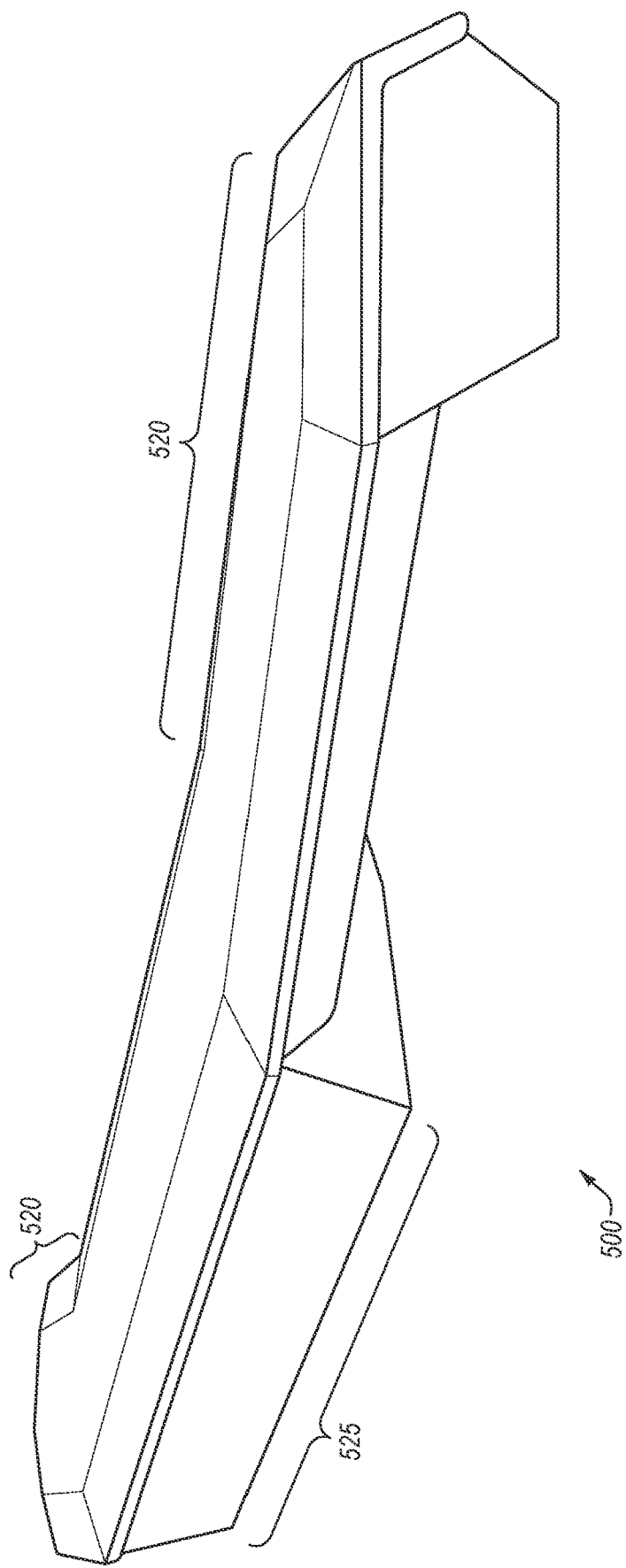
FIGS. 32-34 illustrate a roof pod arranged according to an embodiment.
Figure 33:
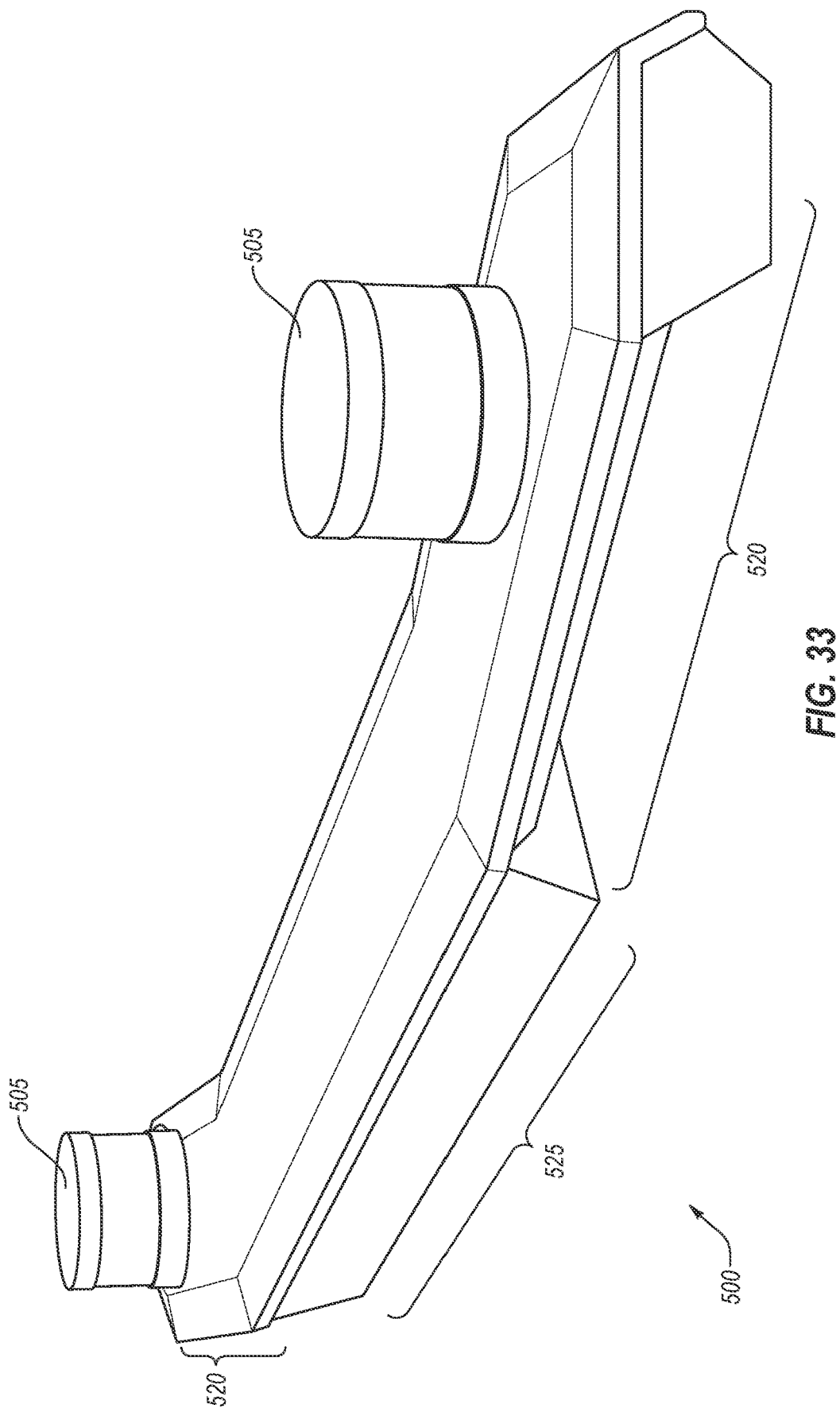
Figure 34:
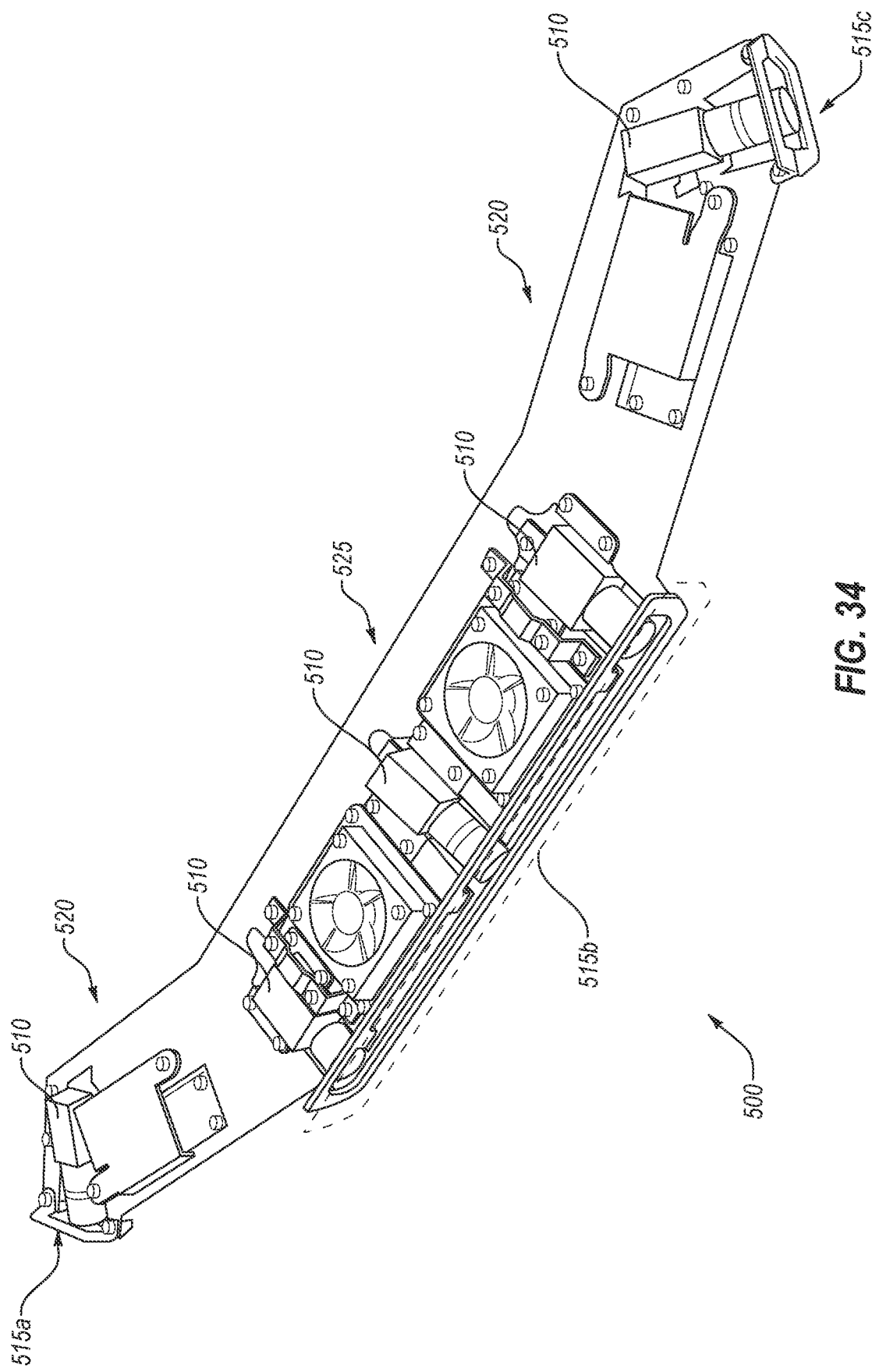

FIGS. 32-34 illustrate another example roof pod 500 arranged according to one or more embodiments of the present disclosure. The roof pod 500 may include a LIDAR sensor 505 (illustrated in FIG. 28), a camera 510 (illustrated in FIG. 34), sensing windows 515a/515b/515c (illustrated in FIG. 34), modular ends 520, and center piece 525. The roof pod 500 may be the same as or similar to the roof pod 110/110' discussed above. The LIDAR sensors 505 may be same as or similar to the LIDAR sensors 150/250/405 discussed above. The cameras 510 may be the same as or similar to the sensors 150/250 discussed above.

Figure 28:
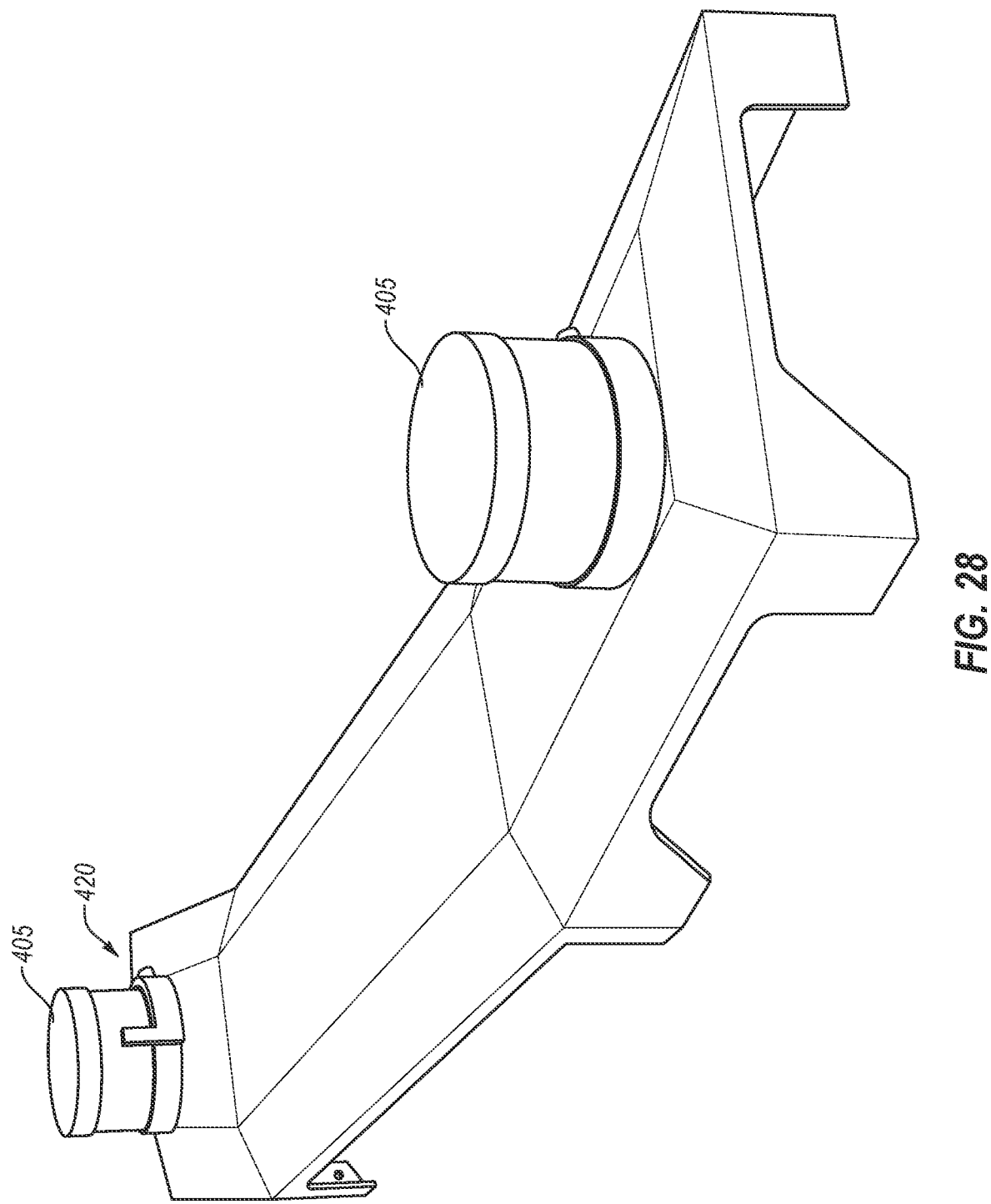
Figure 29:
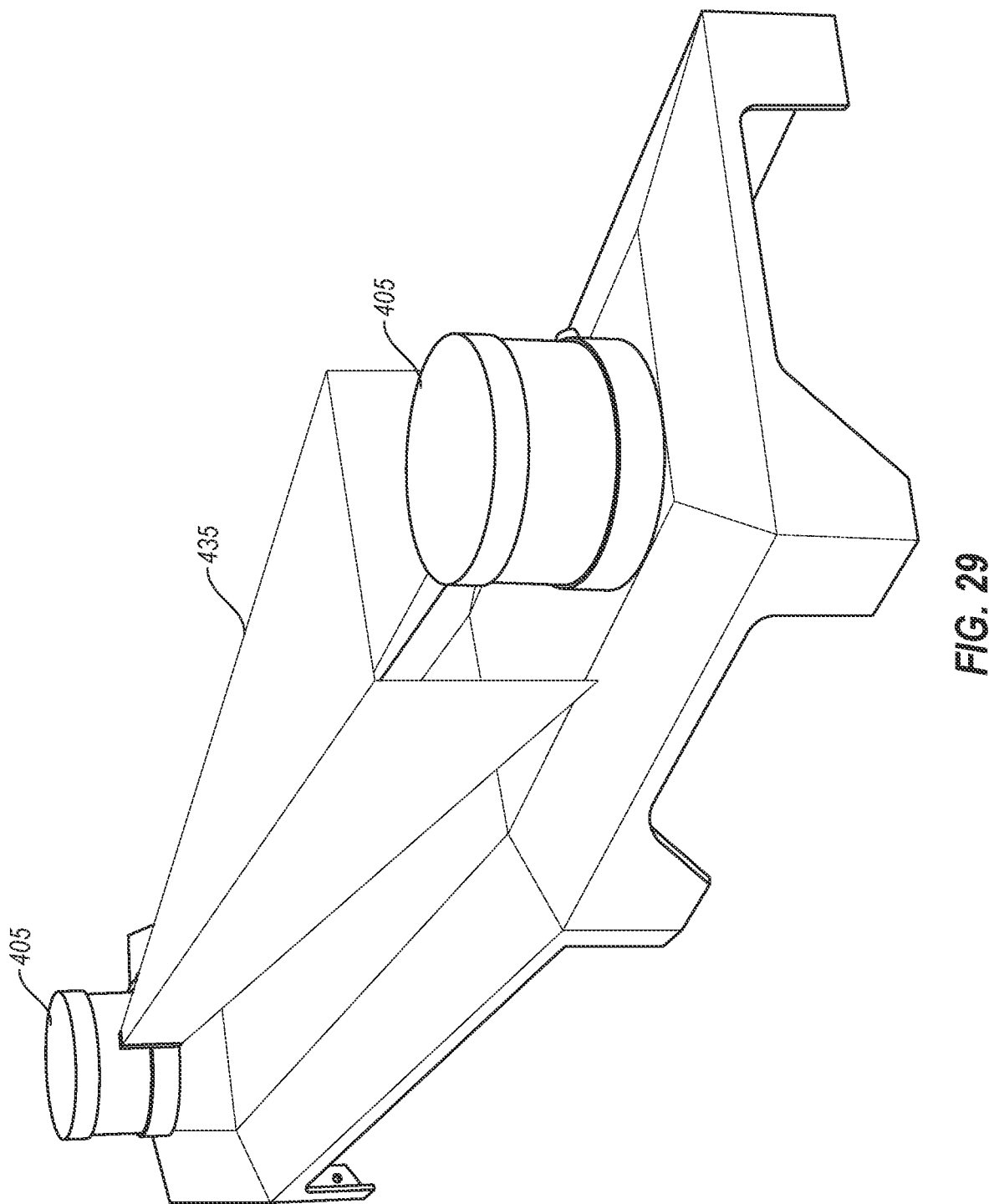
Figure 30:
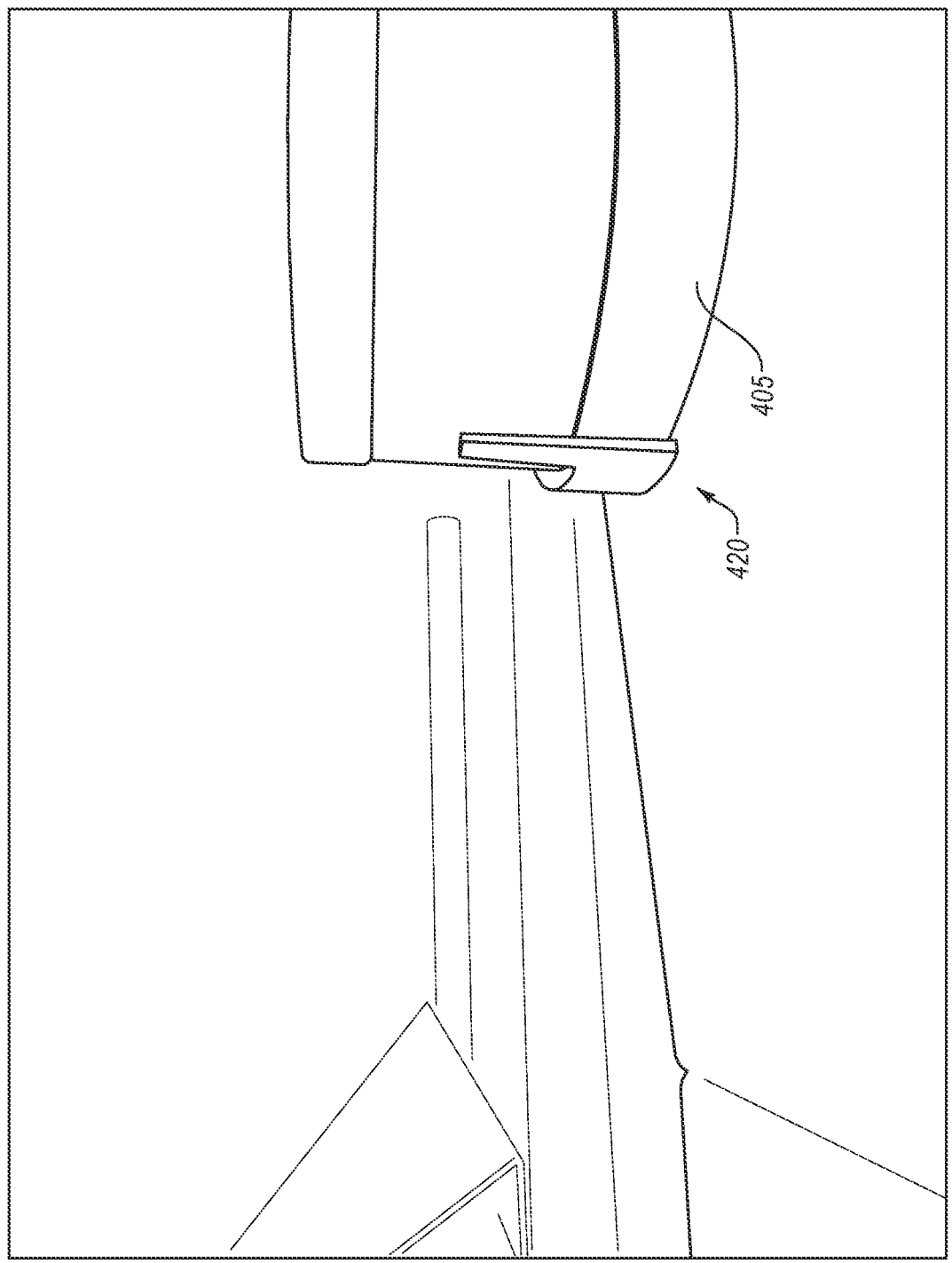
Figure 31:
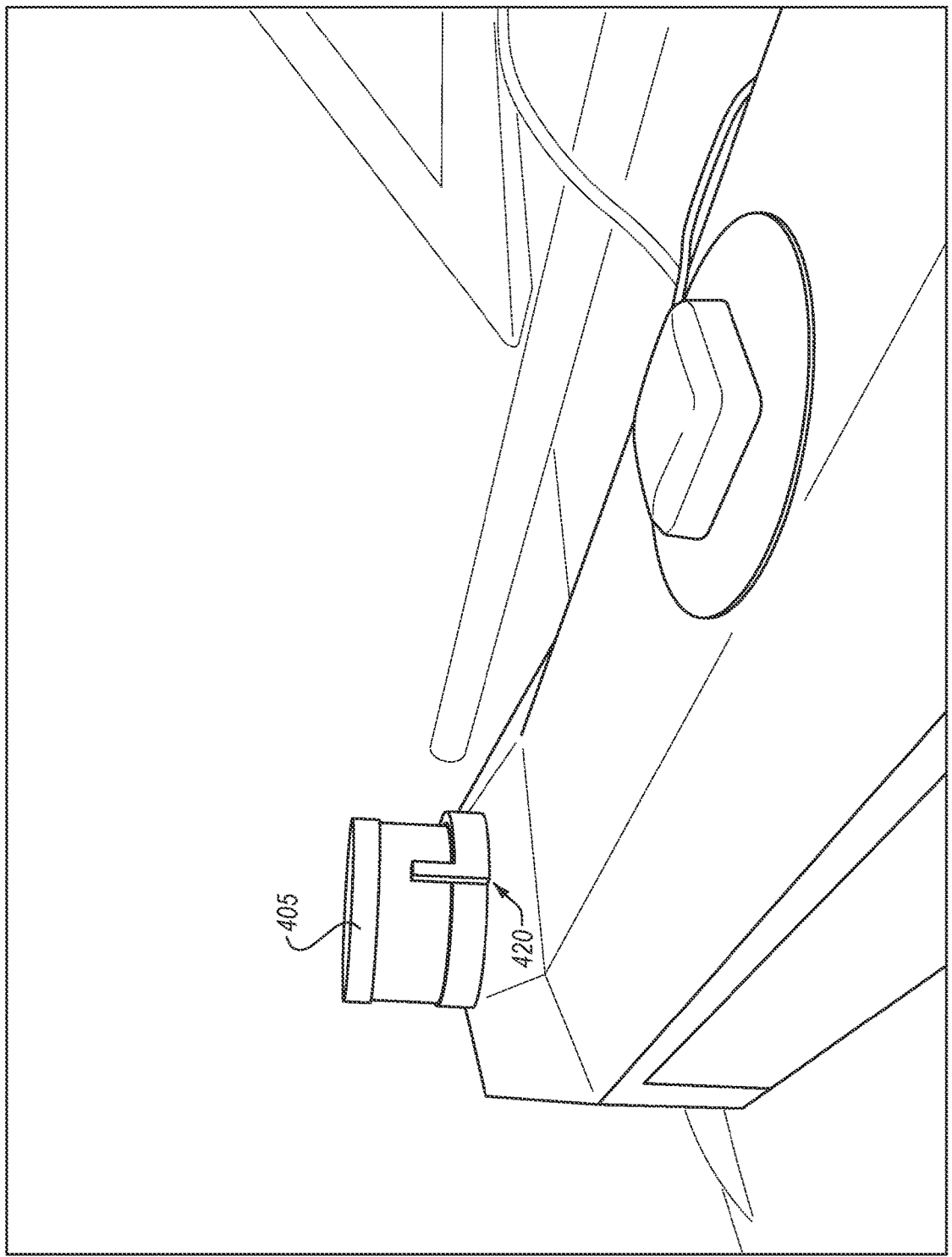

In these or other embodiments, the sensing windows 515 may be sized and shaped to allow various configurations (e.g., roll, pitch, yaw, height, etc.) of a sensor such as the cameras 510. Additionally or alternatively, the sensing windows 515 may be sized and shaped to allow for shifting of a field of view of a sensor such as the cameras 510. For example, the size and/or shape of the sensing windows 515 may enable changing the field of view from a first orientation to a second orientation that is different from the first orientation. In these or other embodiments, based on the size and/or shape of the sensing windows 515, the changing of the field of view may be achieved without altering dimensions of the field of view or causing interference to the field of view. Additionally or alternatively, the sensing windows 515 may be covered or filled in as shown in FIG. 28.

Additionally or alternatively, the roof pod 500 may be modularly designed to be compatible with a variety of different sized vehicles. For example, the modular ends 520 may be sized and shaped to fit different widths of vehicles. Additionally or alternatively, the center piece 525 may be sized and shaped to fit different widths of vehicles.

Generally, the processor may include any suitable special-purpose or general-purpose computer, computing entity, or processing device including various computer hardware or software modules and may be configured to execute instructions stored on any applicable computer-readable storage media. For example, the processor may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Additionally, the processor may include any number of processors distributed across any number of network or physical locations that are configured to perform individually or collectively any number of operations described in the present disclosure. In some embodiments, the processor may interpret and/or execute program instructions and/or process data stored in the memory, the data storage, or the memory and the data storage. In some embodiments, the processor may fetch program instructions from the data storage and load the program instructions into the memory.

After the program instructions are loaded into the memory, the processor may execute the program instructions, such as instructions to perform any of the operations of the present disclosure.

The memory and the data storage may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor. In some embodiments, the computing system may or may not include either of the memory and the data storage.

By way of example, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store desired program code in the form of computer-executable instructions or data structures and which may be accessed by a general-purpose or special-purpose computer. The non-transitory computer-readable medium may have stored therein executable code with instructions for the performance of operations. Combinations of the above may also be included within the scope of computer-readable storage media. Computer-executable instructions may include, for example, instructions and data configured to cause the processor 910 to perform a certain operation or group of operations.

The communication unit may include any component, device, system, or combination thereof that is configured to transmit or receive information over a network. In some embodiments, the communication unit may communicate with other devices at other locations, the same location, or even other components within the same system. For example, the communication unit may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit may allow the computing system to communicate with other systems, such as computing devices and/or other networks, or even other AVs.

As used in the present disclosure, the terms "user device" or "computing device" or "non-transitory computer readable medium" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing device" may be any computing system as previously defined in the present disclosure, or any module or combination of modules running on a computing device.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, and/or others) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

What is claimed is:

1. A modular sensor kit, comprising:
    a modular sensor bumper configured for coupling to a vehicle and including at least one replaceable first sensor for sensing first data;
    a modular roof pod configured for coupling to the vehicle and including at least one replaceable second sensor for sensing second data;
    a processor configured to receive the first data and the second data; and
    a sensor shield coupled to the at least one replaceable first sensor and the at least one replaceable second sensor, the sensor shield comprising:
        a first portion positioned along a non-sensing base area of the at least one replaceable first sensor or the at least one replaceable second sensor, wherein the first portion is supportively connected to a second portion; and
        the second portion positioned in front of a sensing area of the at least one replaceable first sensor or the at least one replaceable second sensor.

2. The modular sensor kit of claim 1, wherein the at least one replaceable first sensor comprises at least one of a LIDAR sensor, an ultrasonic sensor, and a camera.

3. The modular sensor kit of claim 1, wherein the at least one replaceable second sensor comprises at least one of a LIDAR sensor, an ultrasonic sensor, and a camera.

4. The modular sensor kit of claim 1, wherein each of the modular sensor bumper and the modular roof pod are configured for having one or more additional sensors coupled thereto.

5. The modular sensor kit of claim 1, wherein the modular roof pod is configured to couple to the vehicle via at least one mounting shim or tripod.

6. The modular sensor kit of claim 1, wherein the modular sensor bumper is configured to be attached to a rear of the vehicle and the modular sensor bumper includes two or more replaceable first sensors in which positioned to sense first data toward a front of the vehicle and at least one side of the vehicle.

7. The modular sensor kit of claim 1, wherein the modular roof pod is expandable in a front-to-back direction or a side-to-side direction.

8. The modular sensor kit of claim 1, wherein the modular sensor bumper is expandable in a front-to-back direction or a side-to-side direction.

9. The modular sensor kit of claim 1, further comprising a leveling assembly coupled to the modular roof pod or the modular sensor bumper, wherein the leveling assembly comprises:
   a mounting base including a receiving cavity and an inner cavity surface; and
   a mounting plate including a first surface configured to be positioned flush against the inner cavity surface of the mounting base and a second surface to which the modular roof pod or the modular sensor bumper is coupled by one or more fasteners.

10. The modular sensor kit of claim 9, wherein the leveling assembly further comprises one or more adjustment screws, wherein tightening the adjustment screws adjusts a roll or a pitch of the mounting plate.

11. The modular sensor kit of claim 9, wherein the leveling assembly further comprises a visual cue bubble indicating a level of the mounting plate relative to a driving surface.

* * * * *